US012583502B2

(12) United States Patent
Usui et al.

(10) Patent No.: US 12,583,502 B2
(45) Date of Patent: Mar. 24, 2026

(54) STEERING COLUMN ADJUSTING DEVICE AND STEERING COLUMN ADJUSTING METHOD

(71) Applicant: HONDA MOTOR CO., LTD., Tokyo (JP)

(72) Inventors: Shogo Usui, Tokyo (JP); Koji Hashimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/280,655

(22) Filed: Jul. 25, 2025

(65) Prior Publication Data

US 2026/0042479 A1 Feb. 12, 2026

(30) Foreign Application Priority Data

Aug. 9, 2024 (JP) ................................. 2024-134328

(51) Int. Cl.
*B62D 1/189* (2006.01)
*B62D 1/181* (2006.01)
(52) U.S. Cl.
CPC .............. *B62D 1/189* (2013.01); *B62D 1/181* (2013.01)
(58) Field of Classification Search
CPC ................................. B62D 1/189; B62D 1/181
See application file for complete search history.

(56) References Cited

U.S. PATENT DOCUMENTS

| | | | | | |
|---|---|---|---|---|---|
| 12,454,203 B2 * | 10/2025 | Munoz Perez | ........ | B62D 1/187 | |
| 2003/0116362 A1 * | 6/2003 | Breed | .................. | B60N 2/0252 | |
| | | | | 177/144 | |

| | | | | |
|---|---|---|---|---|
| 2005/0263339 A1 * | 12/2005 | Ono | ........................ | B62D 5/008 |
| | | | | 180/443 |
| 2009/0051303 A1 * | 2/2009 | Holloway | ............. | H02P 29/032 |
| | | | | 318/434 |
| 2018/0354545 A1 * | 12/2018 | Riefe | ........................ | B60R 21/01 |
| 2020/0001912 A1 * | 1/2020 | Abuaita | ................. | B62D 1/181 |
| 2023/0399043 A1 * | 12/2023 | Fehlings | ................ | B62D 1/183 |
| 2024/0124046 A1 * | 4/2024 | Forte | ........................ | B62D 5/001 |
| 2024/0308337 A1 * | 9/2024 | Jain | ........................ | B60R 16/037 |
| 2025/0346158 A1 * | 11/2025 | Zahid | .................... | B60N 2/0277 |

FOREIGN PATENT DOCUMENTS

| | | | | | |
|---|---|---|---|---|---|
| JP | 2006-96206 A | | 4/2006 | | |
| JP | 2006096206 A | * | 4/2006 | | |
| WO | WO-2024115206 A1 | * | 6/2024 | ............... | B62D 1/18 |
| WO | WO-2025051666 A1 | * | 3/2025 | ............. | B62D 1/181 |

\* cited by examiner

*Primary Examiner* — Paul N Dickson
*Assistant Examiner* — Shams Dhanani
(74) *Attorney, Agent, or Firm* — Rankin, Hill & Clark LLP

(57) ABSTRACT

A steering column adjusting device includes an actuator that drives a posture adjusting mechanism of a steering column, and a detection unit that detects a current posture position of a steering column, from an operating value indicating an operation amount of the actuator based on one of two movable limit positions of a posture adjusting mechanism, and stores an operating value indicating an overload position at which the actuator is overloaded. The detection unit modifies, when the operating value indicating a current overload position detected when the actuator is operated in one moving direction matches with the operating value indicating a previous overload position stored in a previous operation of the actuator in the one moving direction, the operating value such that the current overload position is the movable limit position in the one moving direction.

8 Claims, 10 Drawing Sheets

FIG.9

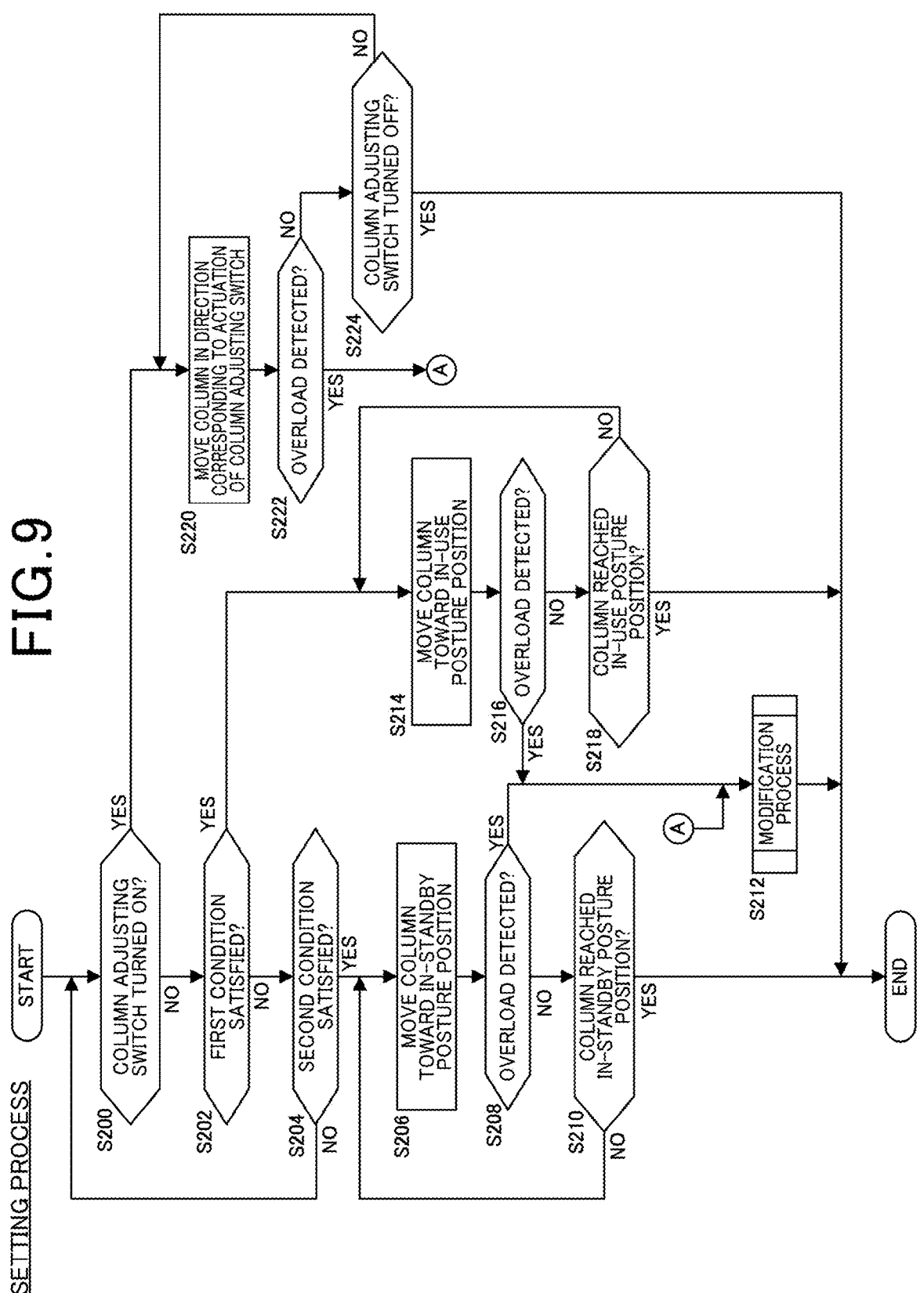

SETTING PROCESS

START

S200 COLUMN ADJUSTING SWITCH TURNED ON?

S202 FIRST CONDITION SATISFIED?

S204 SECOND CONDITION SATISFIED?

S206 MOVE COLUMN TOWARD IN-STANDBY POSTURE POSITION

S208 OVERLOAD DETECTED?

S210 COLUMN REACHED IN-STANDBY POSTURE POSITION?

S212 MODIFICATION PROCESS

S214 MOVE COLUMN TOWARD IN-USE POSTURE POSITION

S216 OVERLOAD DETECTED?

S218 COLUMN REACHED IN-USE POSTURE POSITION?

S220 MOVE COLUMN IN DIRECTION CORRESPONDING TO ACTUATION OF COLUMN ADJUSTING SWITCH

S222 OVERLOAD DETECTED?

S224 COLUMN ADJUSTING SWITCH TURNED OFF?

END

A

STEERING COLUMN ADJUSTING DEVICE AND STEERING COLUMN ADJUSTING METHOD

INCORPORATION BY REFERENCE

The present application claims priority under 35 U.S.C. § 119 to Japanese Patent Application No. 2024-134328 filed on Aug. 9, 2024. The content of the application is incorporated herein by reference in its entirety.

BACKGROUND OF THE INVENTION

Field of the Invention

The present invention relates to a steering column adjusting device and a steering column adjusting method.

Description of the Related Art

In recent years, efforts to provide access to sustainable transportation systems that take into consideration vulnerable persons among traffic participants have become active. In order to achieve this, attention has been focused on research and development to further improve traffic safety and convenience through research and development related to driving assistance techniques.

Japanese Patent Laid-Open No. 2006-96206 discloses a driving posture adjusting device that finely adjusts a driving position of a target part of a vehicle, such as a seat or a steering wheel, when it is detected that a driver is dissatisfied with the driving position of the target part.

SUMMARY OF THE INVENTION

Incidentally, the driving assistance technique has a problem to accurately adjust a posture of a steering column, which is a part of a steering device, to a posture preferred by the driver.

In the above-described related art, when there is a deviation in a position detection of the target part in a case of finely adjusting the driving position of the target part, it may not be possible to adjust the driving position of the target part with high accuracy enough to alleviate dissatisfaction of the driver.

In order to solve the above problems, the present application aims to appropriately modify a deviation in detection of a posture of a steering column and to enable adjustment of the posture of the steering column with high accuracy. Thus, the present application contributes to development of a sustainable transportation system.

A first aspect of the present invention provides a steering column adjusting device that adjusts a posture of a steering column of a vehicle, the steering column adjusting device including: an actuator that drives a posture adjusting mechanism of the steering column to move a posture position of the steering column within a movable range defined by two movable limit positions in the posture adjusting mechanism; and a detection unit that detects a current posture position of the steering column, the detection unit being configured to detect the current posture position of the steering column from an operating value indicating an operation amount of the actuator based on one of the movable limit positions, the detection unit being configured to store the operating value indicating an overload position, which is the posture position at which the actuator is put in an overload equal to or greater than a predetermined threshold during an operation of the actuator, the detection unit being configured to modify, when the operating value indicating a current overload position detected when the actuator is operated in one moving direction matches, within a predetermined error range, with the operating value indicating a previous overload position stored in a previous operation of the actuator in the one moving direction, the operating value such that the current overload position is the movable limit position in the one moving direction.

A second aspect of the present invention provides a steering column adjusting method executed by a computer of a steering column adjusting device that adjusts a posture of a steering column of a vehicle, the steering column adjusting method including: a setting step of driving a posture adjusting mechanism of the steering column using an actuator to move a posture position of the steering column within a movable range defined by two movable limit positions in the posture adjusting mechanism; and a detection step of detecting a current posture position of the steering column, the detection step including detecting the current posture position of the steering column from an operating value indicating an operation amount of the actuator based on one of the movable limit positions, storing the operating value indicating an overload position, which is the posture position at which the actuator is put in an overload equal to or greater than a predetermined threshold during an operation of the actuator, modifying, when the operating value indicating a current overload position detected when the actuator is operated in one moving direction matches, within a predetermined error range, with the operating value indicating a previous overload position stored in a previous operation of the actuator in the one moving direction, the operating value such that the current overload position is the movable limit position in the one moving direction.

According to aspects of the present invention, it is possible to appropriately modify a deviation in detection of a posture of a steering column and to enable adjustment of the posture of the steering column with high accuracy.

BRIEF DESCRIPTION OF THE DRAWINGS

FIG. 9 is a flowchart illustrating a procedure of a setting process executed by the steering column adjusting device.

DETAILED DESCRIPTION OF THE INVENTION

An embodiment of the present invention will be described below with reference to the drawings.

1. Overall Configuration

Figure 1:
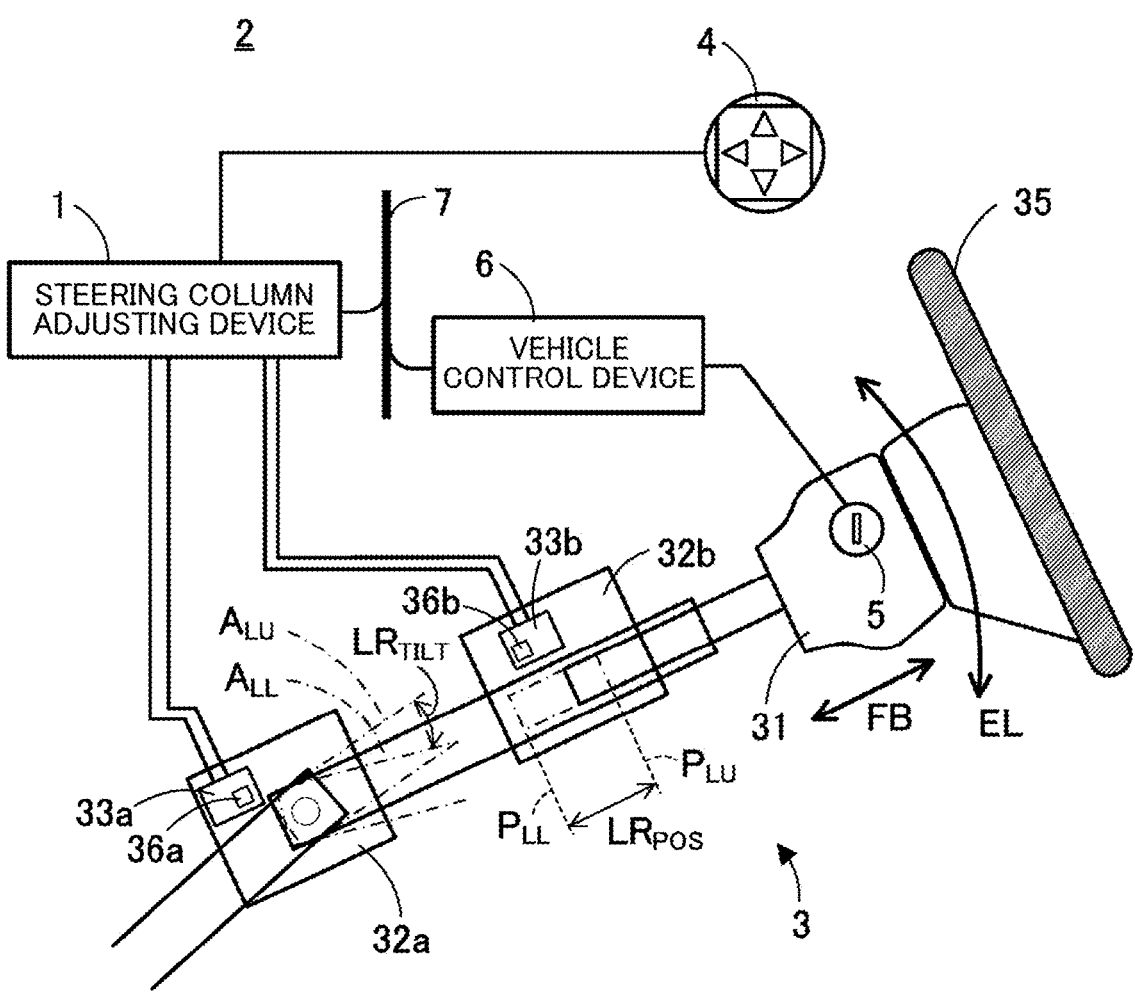
FIG. 1 is a diagram illustrating an example of a configuration of an electric steering column to which a steering column adjusting device according to an embodiment of the present invention is applied.

FIG. 1 is a diagram illustrating an example of a configuration of an electric steering column 3 of a vehicle 2 to which a steering column adjusting device 1 according to an embodiment of the present invention is applied. The vehicle 2 is, for example, an electric vehicle driven by a battery. The electric steering column 3 includes, as posture adjusting mechanisms for a steering column 31, a tilt steering mechanism 32*a* that adjust a tilt angle $\theta$ (to be described below) which is an angle in an elevation angle direction EL of the steering column 31, and a telescopic steering mechanism 32*b* that adjusts a front-back position $P_{FB}$ (to be described below) which is a position in a front-back direction FB of the steering column 31. Hereinafter, unless otherwise distinguished, the tilt steering mechanism 32*a* and the telescopic steering mechanism 32*b* will be collectively referred to as a posture adjusting mechanism 32.

The tilt steering mechanism 32*a* and the telescopic steering mechanism 32*b* are driven by actuators 33*a* and 33*b*, respectively. Hereinafter, unless otherwise distinguished, the actuators 33*a* and 33*b* will be collectively referred to as an actuator 33.

The actuator 33 drives the posture adjusting mechanism 32 of the steering column 31 to move a posture position of the steering column 31 within a movable range defined by two movable limit positions in the posture adjusting mechanism 32.

Specifically, the actuator 33*a* drives the tilt steering mechanism 32*a* to change the tilt angle $\theta$ of the steering column 31 within a movable range $LR_{TILT}$ defined by two movable limit positions $A_{LU}$ and $A_{LL}$ in the tilt steering mechanism 32*a*, thereby moving a posture position in an elevation angle direction EL of the steering column 31. Here, the tilt angle $\theta$ can be defined as, for example, an angle measured from the movable limit position $A_{LL}$ in a direction toward the movable limit position $A_{LU}$, with the movable limit position $A_{LL}$ being set as a zero (0) degree. The tilt angle $\theta$ has a maximum value $\theta_{max}$ at the movable limit position $A_{LU}$.

In addition, the actuator 33*b* drives the telescopic steering mechanism 32*b* to change a front-back position $P_{FB}$ of the steering column 31 within a movable range $LR_{POS}$ defined by two mechanical movable limit positions $P_{LU}$ and $P_{LL}$ in the telescopic steering mechanism 32*b*, thereby moving a posture position in the front-back direction FB of the steering column 31. Here, the front-back position $P_{FB}$ can be defined as, for example, a distance measured from the position of the movable limit position $P_{LL}$ in a direction of the movable limit position $P_{LU}$. The front-back position $P_{FB}$ has a maximum value $P_{max}$ at the movable limit position $P_{LU}$.

Hereinafter, unless otherwise distinguished, the movable limit positions $A_{LU}$ and $P_{LU}$ will be collectively referred to as a movable limit position LU, and unless otherwise distinguished, the movable limit positions $A_{LL}$ and $P_{LL}$ will be collectively referred to as a movable limit position LL. Unless otherwise distinguished, the movable ranges $LR_{TILT}$ and $LR_{POS}$ will be collectively referred to as a movable range LR.

In other words, the actuator 33 drives the posture adjusting mechanism 32 of the steering column 31 to move the posture position of the steering column 31 within the movable range LR defined by two movable limit positions LU and LL in the posture adjusting mechanism 32.

In the following description, regarding operations common to the tilt steering mechanism 32*a* and the telescopic steering mechanism 32*b* will be described as operations of the posture adjusting mechanism 32, which is a general term for the tilt steering mechanism 32*a* and the telescopic steering mechanism 32*b*. Hereinafter, the operation of the posture adjusting mechanism 32 common to the tilt steering mechanism 32*a* and the telescopic steering mechanism 32*b* may be specifically described using the operation of the tilt steering mechanism 32*a* and/or the telescopic steering mechanism 32*b*.

The steering column adjusting device 1 adjusts the posture of the steering column 31 by operating the actuator 33 of the posture adjusting mechanism 32 in response to an input from a column adjusting switch 4 actuated by a driver of the vehicle 2 and/or a change in state of a vehicle power switch 5 which turns on and off a power supply (not illustrated) of the vehicle 2. Here, the steering column adjusting device 1 acquires information indicating a state of the vehicle power switch 5 when the vehicle power switch 5 is actuated via, for example, a vehicle control device 6 that is mounted in the vehicle 2 and that includes a second processor to control the vehicle 2, and thus detects a change in state of the vehicle power switch 5. In addition, when the vehicle 2 is driven by an internal combustion engine, the vehicle power switch 5 may be an ignition switch that starts or stops the operation of the internal combustion engine. The steering column adjusting device 1 and the vehicle control device 6 are communicably connected to each other via an in-vehicle network bus 7.

The column adjusting switch 4 may be disposed on a steering wheel 35 or an instrument panel (not illustrated) of the vehicle 2. The column adjusting switch 4 is, for example, a rocker switch, and instructs the steering column adjusting device 1 to move the posture position in the elevation angle direction EL upward or downward when an arrow pointing upward or downward illustrated in the drawing is pressed. In addition, the column adjusting switch 4 instructs the steering column adjusting device 1 to move the posture position in the front-back direction FB forward or backward when an arrow pointing leftward or rightward illustrated in the drawing is pressed.

The actuators 33*a* and 33*b* include sensors 36*a* and 36*b* that generates a predetermined signal for each unit operation amount of the actuators 33*a* and 33*b*, respectively. Hereinafter, unless otherwise distinguished, the sensors 36*a* and 36*b* will be collectively referred to as a sensor 36.

Figure 2:
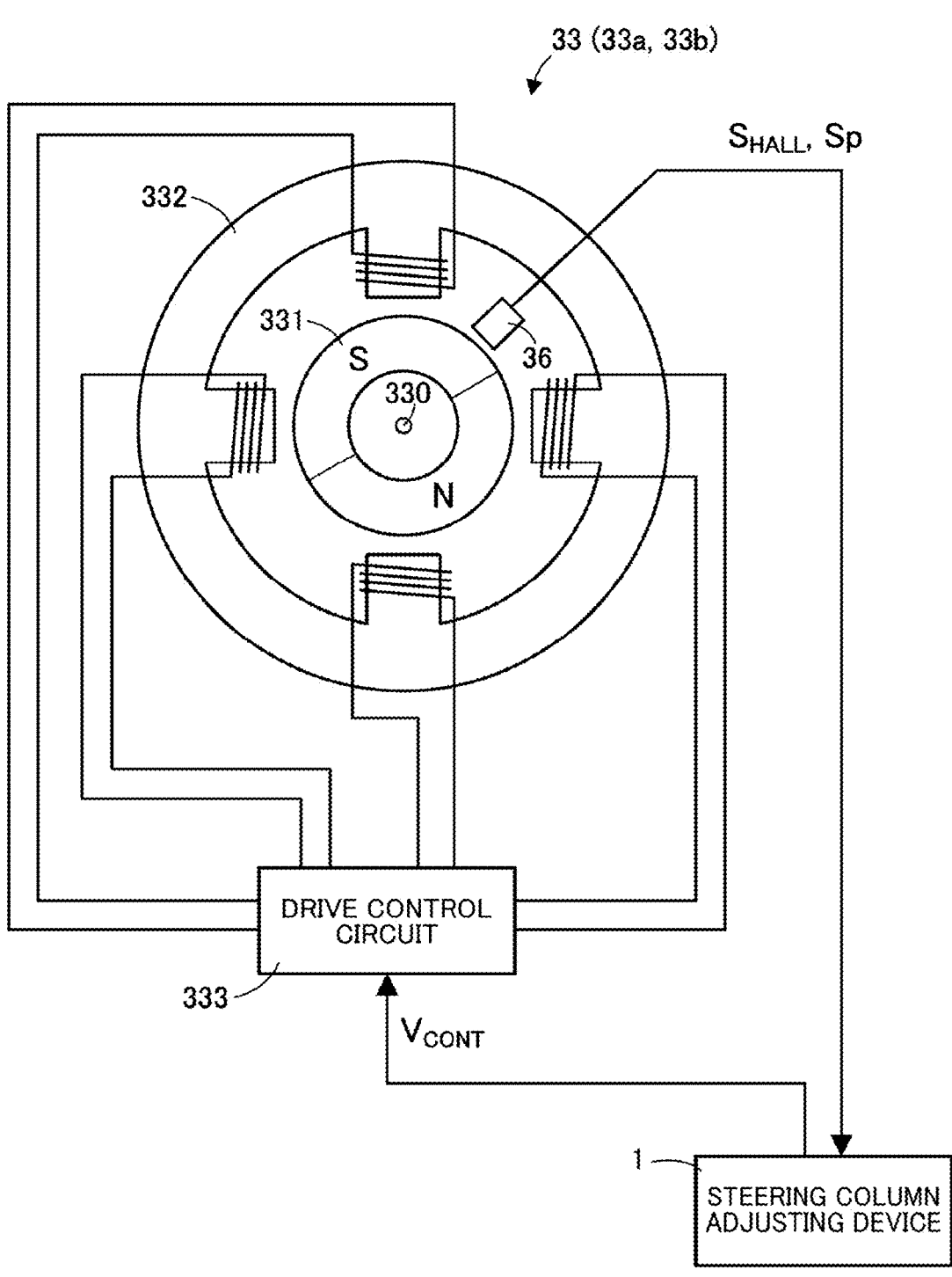
FIG. 2 is a diagram illustrating a cross-sectional configuration orthogonal to a rotation axis of a stepping motor, which is an example of an actuator for driving a posture adjusting mechanism.

In the present embodiment, as an example, each of the actuator 33 is a stepping motor. FIG. 2 is a diagram illustrating an example of a cross-sectional configuration orthogonal to a rotation axis of the stepping motor, which is the actuator 33. The actuator 33, which is the stepping motor, includes a magnet rotor 331, a stator 332, and one sensor 36 that is a Hall sensor. The magnet rotor 331 is a cylindrical magnet having a plurality of magnetic poles arranged at equal intervals along a circumference, and rotates together with the rotation axis 330. In the configuration illustrated in FIG. 2, the magnet rotor 331 has two magnetic poles, as an example. In other words, the magnet rotor 331 has one S pole and one N pole arranged respectively in half-circumference regions that divide an outer circumference of the magnet rotor 331 into two equal parts. The number of magnetic poles can be any multiple of two, depending on the design of the stepping motor according to the related arts.

The stator 332 is formed of a cylindrical magnetic body including a plurality of coils arranged at equal intervals along an inner circumference. In the configuration of FIG. 2, as an example, the stator 332 includes four coils. The four coils are energized by a drive control circuit 333. In addition, the shape of the stator 332 and the number of coils can be any number other than four depending on the design of the stepping motor according to the related arts.

The drive control circuit 333 is arranged on the posture adjusting mechanism 32. The drive control circuit 333 sequentially changes the magnetic poles generated in the four coils to a clockwise direction or a counterclockwise direction according to the related arts to rotate the magnet rotor 331 in a clockwise direction or a counterclockwise direction. Specifically, the drive control circuit 333 rotates the magnet rotor 331 in a clockwise direction or a counterclockwise direction, or stops rotating, according to a voltage value of an instruction voltage $V_{CONT}$ applied from the steering column adjusting device 1.

The sensor 36 is arranged near the outer circumference of the magnet rotor 331, for example. The sensor 36 may include not only a Hall element but also an integrated circuit for outputting the output of the Hall element as a voltage output.

According to a known technique, the sensor 36 outputs a square wave signal $S_{HALL}$ as a voltage signal according to a change in magnetic field applied to the sensor 36, as the magnetic poles of the magnet rotor 331 pass through the position of the sensor 36 as the magnet rotor 331 rotates. Since the magnetic poles are arranged at equal intervals in the magnet rotor 331, the square wave signal $S_{HALL}$ becomes a High level with each rotation of a unit angle corresponding to the intervals between the magnetic poles as the magnet rotor 331 rotates.

In the present embodiment, the square wave signal $S_{HALL}$ output from the sensor 36 becomes, for example, a High level while an N pole of the magnet rotor 331 passes the position of the sensor 36, and becomes a Low level while an S pole passes. In the configuration of FIG. 2, since the magnet rotor 331 has an S pole and an N pole arranged respectively in half-circumference regions that divide an outer circumference thereof into two equal parts, the N pole passes the position of the sensor 36 every time the magnet rotor 331 rotates once. Therefore, in the present embodiment, the unit angle is 360 degrees. In other words, the square wave signal $S_{HALL}$ output from the sensor 36 includes a pulse signal Sp that becomes a High level every time the magnet rotor 331 rotates through a 360-degree unit angle. The sensor 36 outputs the square wave signal $S_{HALL}$ to the steering column adjusting device 1.

In the present embodiment, the brushless stepping motor including the magnet rotor 331 has been illustrated as an example of the actuator 33, but the actuator 33 may be a brush-equipped stepping motor including a rotor coil. In the case of the brush-equipped stepping motor, the sensor 36 as a Hall sensor may be provided near the rotor coil. Thus, similarly to the above-described brushless stepping motor, the sensor 36 can output a square wave signal $S_{HALL}$ including a pulse signal Sp generated each time the rotor coil rotates at a predetermined unit angel.

Figure 3:
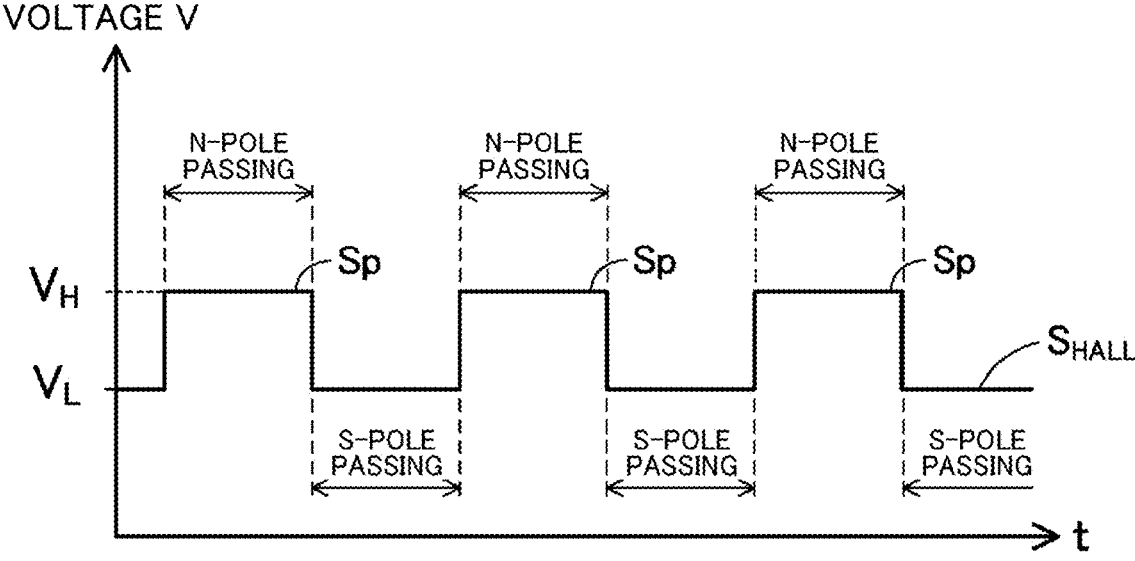
FIG. 3 is a graph illustrating an example of a square wave signal output from a sensor in the configuration of the actuator in FIG. 2.

FIG. 3 is a graph illustrating an example of the square wave signal $S_{HALL}$ output from the sensor 36 to the steering column adjusting device 1. In FIG. 3, a vertical axis represents a voltage value V, and a horizontal axis represents time t. FIG. 3 illustrates a change in the square wave signal $S_{HALL}$ over time when the magnet rotor 331 rotates at a constant speed. As illustrated in the drawing, the square wave signal $S_{HALL}$ alternates between a voltage VH of a High level and a voltage VL of a Low level as the N pole and the S pole of the magnet rotor 331 sequentially pass through the position of the sensor 36, which is a Hall sensor. As a result, as described above, the square wave signal $S_{HALL}$ includes the pulse signal Sp generated each time the magnet rotor 331 rotates at a unit angle of 360 degrees.

The steering column adjusting device 1 detects the current posture position of the steering column 31, from an operating value that indicates the operation amount of the actuator 33 based on one movable limit position of the posture adjusting mechanism 32, for example, the movable limit position LL. The operating value is a count value obtained by adding and subtracting the number of times of generating a predetermined signal for each unit operation amount of the actuator 33 according to the operation direction of the actuator 33. The operating value may represent the operation amount of the actuator 33 based on the movable limit position LU.

In the present embodiment, the predetermined signal is the pulse signal Sp included in the square wave signal $S_{HALL}$ output from the sensor 36, which is generated every time the magnet rotor 331 of the stepping motor serving as the actuator 33 rotates at a unit angle.

The steering column adjusting device 1 can grasp the rotation angle of the magnet rotor 331, that is, the operation amount of the actuator 33 serving as the stepping motor, from a count value Nc obtained by adding and subtracting the number of times of generating the pulse signal Sp according to the rotation direction of the magnet rotor 331. The steering column adjusting device 1 detects the current posture position of the steering column 31 from the count value Nc, which is an operation value indicating the operation amount of the actuator 33 serving as a stepping motor.

Specifically, the steering column adjusting device 1 sets the count value Nc to 0 (zero) when the steering column 31 is at one movable limit position LL of the posture adjusting mechanism 32. Then, the steering column adjusting device 1 adds the number of times of generating the pulse signal Sp, which is output from the sensor 36, to the count value Nc when the steering column 31 rotates the magnet rotor 331 to move toward the other movable limit position LU of the posture adjusting mechanism 32. In addition, the subtracts the number of times of generating the pulse signal Sp, which is output from the sensor 36, to the count value Nc when the steering column 31 rotates the magnet rotor 331 to move toward the one movable limit position LL of the posture adjusting mechanism 32.

Thus, the count value Nc represents the operation amount of the actuator 33 based on the one movable limit position LL of the posture adjusting mechanism 32, and indirectly represents the current posture position of the steering column 31 that moves between the one movable limit position LL and the other movable limit position LU.

Hereinafter, the count value Nc regarding the number of times of generating the pulse signal Sp from the sensor 36a of the tilt steering mechanism 32a is referred to as a count value Nc1, and the count value Nc regarding the number of times of generating the pulse signal Sp from the sensor 36*b* of the telescopic steering mechanism 32*b* is referred to as a count value Nc2. In other words, the count value Nc1 represents the posture position of the steering column 31 that moves from the one movable limit position $A_{LL}$ of the tilt steering mechanism 32*a* toward the other movable limit position $A_{LU}$. In addition, the count value Nc2 represents the posture position of the steering column 31 that moves from the one movable limit position $P_{LL}$ of the telescopic steering mechanism 32*b* toward the other movable limit position $P_{LU}$.

Hereinafter, unless otherwise distinguished, the count value Nc1 and the count value Nc2 will be collectively referred to as a count value Nc.

In the following description, the operation direction of the actuator 33, in which the posture position of the steering column 31 is directed toward the movable limit position LU from the movable limit position LL, is referred to as a "forward direction", while the operation direction of the actuator 33, in which the posture position of the steering column 31 is directed toward the movable limit position LL from the movable limit position LU, is referred to as a "reverse direction". In addition, the rotation direction of the magnet rotor 331 corresponding to the operation in the forward direction of the actuator 33 serving as a stepping motor is referred to as a "forward rotation direction", while the rotation direction of the magnet rotor 331 corresponding to the operation in the reverse direction of the actuator 33 is referred to as a "reverse rotation direction".

The magnet rotor 331 rotates in the forward rotation direction when the steering column adjusting device 1 inputs a forward rotation instruction voltage $V_{CF}$, which is a positive voltage, as an instruction voltage $V_{CONT}$ to the drive control circuit 333 of the actuator 33*a* serving as a stepping motor, and rotates when the steering column adjusting device 1 inputs a reverse rotation instruction voltage $V_{CR}$ which is a negative.

Figure 4:
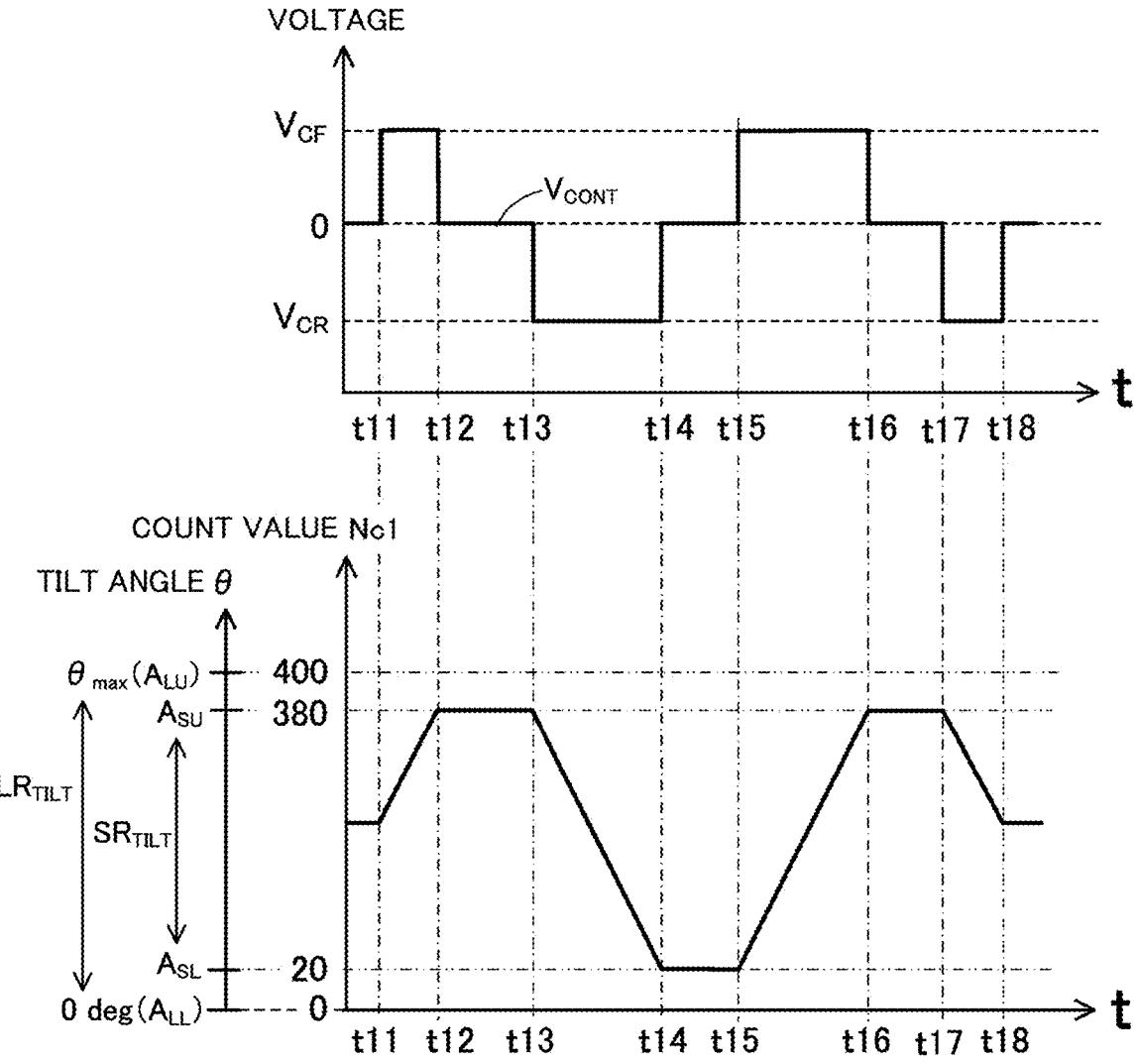
FIG. 4 is a graph illustrating an example of a change in a count value over time with respect to a pulse signal output from the sensor provided in the actuator of a tilt steering mechanism.

FIG. 4 is a graph illustrating an example of a change in count value Nc1 over time with respect to the pulse signal Sp output from the sensor 36*a* provided in the actuator 33*a* that drives the tilt steering mechanism 32*a*.

An upper stage in FIG. 4 indicates a graph illustrating a change over time of the instruction voltage $V_{CONT}$ output by the steering column adjusting device 1 to the drive control circuit 333 of the actuator 33*a* which is a stepping motor. In the upper stage in FIG. 4, a vertical axis represents voltage, and a horizontal axis represents time. Further, a lower stage in FIG. 4 indicates a graph illustrating an example of a change over time of the count value Nc1 according to the change over time of the instruction voltage $V_{CONT}$ illustrated in FIG. 4. In the lower stage in FIG. 4, a right vertical axis of two vertical axes represents the count value Nc1, and a vertical axis on a left side of the count axis represents a tilt angle θ, which is a posture position in the elevation angle direction EL of the steering column 31 corresponding to the count value Nc1. Here, the vertical axis representing the count value Nc1 on the right side is referred to as a count axis, and the vertical axis representing the tilt angle θ on the left side is referred to as a tilt axis.

In the example illustrated in FIG. 4, as illustrated by the tilt axis and the count axis in the lower stage in FIG. 4, the position of the movable limit position $A_{LL}$ of the tilt steering mechanism 32*a*, that is, the posture position of the steering column 31 having a tilt angle θ (=0) corresponds to [count value Nc1=0], and the position of the movable limit position $A_{LU}$ of the tilt steering mechanism 32*a*, that is, the posture position of the steering column 31 having a tilt angle θ

(=$θ_{max}$) corresponds to, for example, [count value Nc1=400]. Further, a method of determining the count value Nc corresponding to the posture position of the steering column 31 having the tilt angle θ (=$θ_{max}$) will be described below with reference to FIG. 8. The above-described [count value Nc1=400] is an example of a correct count value Nc1 (Nc1 limit value $V_{1U}$ to be described below) corresponding to the movable limit position $A_{LU}$.

A range between the movable limit position $A_{LL}$ indicated by the tilt angle θ (=0) on the tilt axis and the movable limit position $A_{LU}$ indicated by the tilt angle θ (=$θ_{max}$) corresponds to the movable range $LR_{TILT}$.

The steering column adjusting device 1 adjusts the posture of the steering column 31 within a set allowable range $SR_{TILT}$ narrower than the movable range $LR_{TILT}$ to avoid the actuator 33*a* from colliding with the movable limit position $A_{LL}$ and/or movable limit position $A_{LU}$ due to a count error in the count value Nc1. The set allowable range $SR_{TILT}$ is defined as a range between two set limit positions $A_{SL}$ and $A_{SU}$, which are distant from the two movable limit positions $A_{LL}$ and $A_{LU}$ by a predetermined margin range, respectively. In the example of the lower stage in FIG. 4, the set allowable range $SR_{TILT}$ is defined as a range that provides a margin range of 20 counts in the count value Nc1 from the movable limit positions $A_{LL}$ and $A_{LU}$, and the set limit positions $A_{SL}$ and $A_{SU}$ correspond to the count values Nc1 of 20 and 380, respectively.

As described above, the steering column adjusting device 1 adjusts the posture of the steering column 31 within a set allowable range $SR_{POS}$ narrower than a movable range $LR_{POS}$ to avoid the actuator 33*b* from colliding with the movable limit position $P_{LL}$ and/or movable limit position $P_{LU}$ due to a count error in the count value Nc2 with respect to the telescopic steering mechanism 32*b*. The set allowable range $SR_{POS}$ is defined as a range between two set limit positions $P_{SL}$ and $P_{SU}$, which are distant from the two movable limit positions $P_{LL}$ and $P_{LU}$ by a predetermined margin range, respectively.

Hereinafter, unless otherwise distinguished, the set limit positions $A_{SL}$ and $P_{SL}$ will be collectively referred to as a set limit position SL, and unless otherwise distinguished, the set limit positions $A_{SU}$ and $P_{SU}$ will be collectively referred to as a set limit position SU. Furthermore, unless otherwise distinguished, the set allowable range $SR_{TILT}$ and the set allowable range $SR_{POS}$ will be collectively referred to as a set allowable range SR.

In other words, the steering column adjusting device 1 adjusts the posture of the steering column 31 within the set allowable range SR narrower than the movable range LR of the posture adjusting mechanism 32. The set allowable range SR is defined as a range between two set limit positions SL and SU, which are distant from two movable limit positions LL and LU by a predetermined margin range, respectively.

Referring to FIG. 4, first, at time t11, for example, when an instruction is given from the column adjusting switch 4 to move the steering column 31 upward in the elevation angle direction EL, the steering column adjusting device 1 sets the instruction voltage $V_{CONT}$ to a forward rotation instruction voltage $V_{CF}$ in order to move the actuator 33*a* in the forward direction, and rotates the magnet rotor 331 of the actuator 33*a* in the forward rotation direction. While moving the actuator 33*a* in the forward direction, the steering column adjusting device 1 adds 1 to the count value Nc1 every time the pulse signal Sp is output from the sensor 36*a* of the actuator 33*a*. Thus, the count value Nc1 increases with time, and reaches a value of 380, which corresponds to the set limit position $A_{SU}$ of the set allowable range $SR_{TILT}$, at time t12. When the count value Nc1 reaches the value of 380 corresponding to the set limit position $A_{SU}$, the steering column adjusting device 1 sets the instruction voltage $V_{CONT}$ to 0 (zero) V and stops the operation of the actuator 33a. Thus, the steering column 31 is held in the posture position of the tilt angle corresponding to the set limit position $A_{SU}$.

Then, at time t13, when an instruction is given from the column adjusting switch 4 to move the steering column 31 downward in the elevation angle direction EL, the steering column adjusting device 1 sets the instruction voltage $V_{CONT}$ to the reverses rotation instruction voltage $V_{CR}$ in order to move the actuator 33a in the reverse direction, and rotates the magnet rotor 331 of the actuator 33a in the reverses rotation direction. While moving the actuator 33a in the reverse direction, the steering column adjusting device 1 subtracts 1 from the count value Nc1 every time the pulse signal Sp is output from the sensor 36a of the actuator 33a. Thus, the count value Nc1 decreases with time.

At time t14, when the count value Nc1 reaches a value of 20 which corresponds to the set limit position $A_{SL}$ of the set allowable range $SR_{TILT}$, the steering column adjusting device 1 sets the instruction voltage $V_{CONT}$ to 0 (zero) V, and stops the operation of the actuator 33a. Thus, the steering column 31 is held in the posture position of the tilt angle corresponding to the set limit position $A_{SL}$.

An operation from time t15 to t16 is similar to the operation from time t11 to t12 described above.

Thereafter, at time t17, when an instruction is given from the column adjusting switch 4 to move the steering column 31 downward in the elevation angle direction EL, the steering column adjusting device 1 sets the instruction voltage $V_{CONT}$ to the reverses rotation instruction voltage $V_{CR}$ to move the actuator 33a in the reverse direction, and subtracts 1 from the count value Nc1 every time the pulse signal Sp is output from the sensor 36a. Then, at time t18, when the column adjusting switch 4 is turned off before the count value Nc1 reaches a value of 20 corresponding to the set limit position $A_{SL}$, the steering column adjusting device 1 sets the instruction voltage $V_{CONT}$ to 0 (zero) V and stops the operation of the actuator 33a. Thus, the steering column 31 is held in the posture position of the tilt angle corresponding to the count value Nc1 at time 18.

In addition, the change over time of the count value Nc2 of the pulse signal Sp output from the sensor 36b of the actuator 33b provided in the telescopic steering mechanism 32b and the operation of the steering column adjusting device 1 regarding the telescopic steering mechanism 32b may be similar to the change over time of the count value Nc1 regarding the tilt steering mechanism 32a illustrated in FIG. 4 and the operation of the steering column adjusting device 1 regarding the tilt steering mechanism 32a described above.

The operation functions properly when the relationship between the count value Nc and the posture position of the steering column 31 in the posture adjusting mechanism 32 (that is, the relationship between the tilt angle θ and the count value Nc1, the relationship between the front-back position $P_{FB}$ and the count value Nc2) is maintained stably.

However, a deviation may occur in the relationship between the count value Nc and the posture position of the steering column 31 to a nonnegligible extent due to various factors.

For example, as described above, the steering column adjusting device 1 determines whether the actuator 33 is moving in the forward direction or in the reverse direction, depending on whether the instruction voltage $V_{CONT}$ applied to the drive control circuit 333 of the actuator 33 is set to the forward rotation instruction voltage $V_{CF}$ or the reverses rotation instruction voltage $V_{CR}$, and adds or subtracts the number of pulse signals Sp output from the sensor 36 to/from the count value Nc. However, after the magnet rotor 331 of the actuator 33, which is a stepping motor, rotates due to energization to the coil of the stator 332 (hereinafter, a stator coil), even when the energization to the stator coil is cut off, the magnet rotor 331 does not necessarily stop at a position during the energization cut-off, and rotates slightly from the position during the energization cut-off due to various factors, whereby the pulse signal Sp can be generated from the sensor 36. Hereinafter, the rotation of the magnet rotor 331 after the energization cut-off is referred to as excess rotation.

The excess rotation can be rotation in any direction depending on various factors including the positions of the magnetic poles of the magnet rotor 331 during the energization cut-off. Therefore, it is unclear whether the number of pulse signals Sp generated by the sensor 36 due to the excess rotation should be added to or subtracted from the count value Nc1, and thus a deviation may occur in the count value Nc with respect to the posture position of the steering column 31.

As a first example, the excess rotation after the energization cut-off is generated, for example, when the magnetic poles of the magnet rotor 331, which has stopped rotating due to the energization cut-off, are attracted to a magnetic core of the nearby stator coil, and the direction of rotation can be forward rotation direction or the reverses rotation direction depending on the positional relationship between the magnetic poles and the magnetic core. For this reason, assuming that the direction of excess rotation is uniformly the same as the direction of rotation before the energization cut-off, for example, when the rotation direction before the energization cut-off is the forward rotation direction, and the number of pulse signals Sp generated from the sensor 36 during the excess rotation is added to the count value Nc, a deviation may occur in the relationship between the count value Nc and the posture position of the steering column 31 when the actual excess rotation is in the reverses rotation direction.

As a second example, the excess rotation after the energization cut-off can be generated, for example, when the driver actuates the column adjusting switch 4 to change the posture position of the steering column 31 and the steering column 31 hits the driver's body or another object to cause the driver to turn off the column adjusting switch 4. In this case, the excess rotation can be generated when the magnet rotor 331 of the actuator 33 rotates due to a force from the steering column 31 pressed by the object after the column adjusting switch 4 is turned off and the energization to the actuator 33 is cut off. Furthermore, the direction of the excess rotation in this case is the forward rotation direction or the reverses rotation direction depending on the direction of the force applied to the steering column 31, it is difficult for the steering column adjusting device 1 to determine whether the pulse signal Sp generated from the sensor 36 during the excess rotation should be added to or subtracted from the count value Nc. As a result, for example, assuming that the number of pulse signals Sp generated by the sensor 36 during the excess rotation is negligible (not added to or subtracted from the count value), a deviation may occur in the relationship between the count value Nc and the posture position of the steering column 31.

As a third example, the excess rotation after the energization cut-off may be generated, for example, when there is backlash in a transmission path of the driving force from the actuator 33 to the posture adjusting mechanism 32 (for example, backlash in meshing of gears), causing the magnet rotor 331 of the actuator 33 to rotate freely within the range of the backlash. It is difficult for the steering column adjusting device 1 to determine the direction of free rotation of the magnet rotor 331, resulting in being a factor that can cause a deviation in the relationship between the count value Nc and the posture position of the steering column 31.

As a fourth example, a boundary between the magnetic poles of the magnet rotor 331 stops at a position of the sensor 36 during the energization cut-off. When the boundary between the magnetic poles stops at the position of the sensor 36, the magnet rotor 331 repeats slightly free rotation in the forward rotation direction and the reverses rotation direction, and the pulse signals Sp can be generated from the sensor 36 by the number of times of repeated rotation. Since these pulse signals Sp are not generated for each unit angle of the magnet rotor 331, when the number of these pulse signals Sp is added to or subtracted from the count value Nc, a deviation may occur in the relationship between the count value Nc and the posture position of the steering column 31.

Furthermore, when there is a deviation in the relationship between the count value Nc and the posture position of the steering column 31, if the steering column adjusting device 1 adjusts the steering column 31 based on the count value Nc, an adjustable range of the posture position of the steering column 31 may become narrower.

Figure 5:
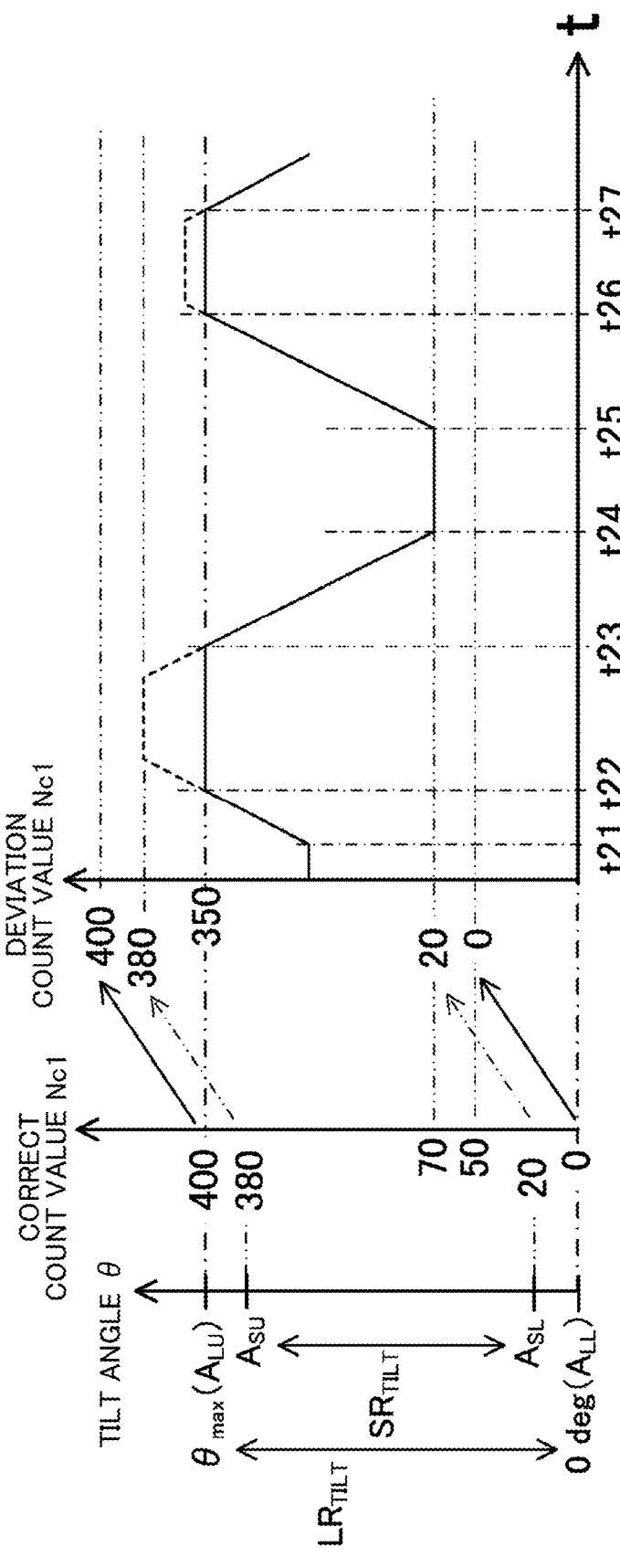
FIG. 5 is an explanatory diagram illustrating an adjustment operation of a steering column when there is a deviation in a relationship between a count value and a posture position of the steering column.

FIG. 5 is an explanatory diagram illustrating an example of an adjustment operation of the steering column 31 when there is a deviation in the relationship between the count value Nc and the posture position of the steering column 31. FIG. 5 illustrates an example of an operation when there is a deviation from a correct corresponding relationship between the tilt angle θ and the count value Nc1 indicated by the tilt axis and the count axis in the lower stage in FIG. 4.

In FIG. 5, the leftmost vertical axis out of three vertical axes on a left side of the drawing is a tilt axis indicating the tilt angle θ of the steering column 31, and the middle vertical axis of the three vertical axes is a first count axis indicating a "correct count value Nc1" having a correct corresponding relationship with the tilt angle. These tilt axis and the first count axis are the same as the tilt axis and the count axis illustrated in the lower stage in FIG. 4.

On the other hand, the rightmost vertical axis out of three vertical axes on the left side in FIG. 5 is a second count axis indicating a "deviation count value Nc1" in which there is a deviation in the corresponding relationship with the tilt angle θ, which is the posture position of the steering column 31. In the illustrated example, the "deviation count value Nc1" indicated by the second count axis deviates, by 50 counts in the forward direction (the direction from the movable limit position $A_{LL}$ toward the movable limit position $A_{LU}$), from the "correct count value Nc1" indicated by the first count axis.

As a result, the posture position of [tilt angle θ=0] corresponding to the movable limit position $A_{LL}$ does not correspond to [count value Nc1=0], and the posture position of [tilt angle θ=$θ_{max}$] corresponding to the movable limit position ALU corresponds not to [count value Nc1=400], but to [count value Nc1=350].

On the other hand, similarly to the case illustrated in FIG. 4, the steering column adjusting device 1 defines the set allowable range $SR_{TILT}$ as a range in which the count value Nc1 is equal to or more than 20 and equal to or less than 380.

Accordingly, for example, at time t21, even when the column adjusting switch 4 is actuated such that the steering column adjusting device 1 attempts to move the steering column 31 up to a position of [count value Nc1=380] corresponding to the set limit position $A_{SU}$ of the set allowable range $SR_{TILT}$ defined above, a position of [count value Nc1=350] is really the movable limit position $A_{LU}$, and thus the steering column 31 reaches the position of [count value Nc1=350] at time t22 and stops.

Thereafter, at time t23, when the column adjusting switch 4 is actuated, the steering column adjusting device 1 moves the steering column 31 in the direction of the movable limit position $A_{LL}$, and when the steering column 31 reaches a position of [count value Nc1=20] corresponding to the set limit position $A_{SL}$ of the set allowable range $SR_{TILT}$ at time t24, the steering column 31 stops moving.

In other words, since the count value Nc1 deviates by 50 counts, the actual adjustment allowable range of the posture position of the steering column 31 that can be adjusted by the steering column adjusting device 1 is in a range of [20≤count value Nc1≤350], which is a range narrower by 30 counts than [20≤count value Nc1≤380] corresponding to the above-defined set allowable range $SR_{TILT}$.

An operation from time t25 to t27 is similar to the operation from time t21 to t23 described above.

In order to solve the problem in that the adjustment range of the posture position of the steering column 31 is reduced due to the deviation in the count value Nc as described above and to move the steering column 31 throughout the entire set allowable range SR, the steering column adjusting device 1 of the present embodiment performs a modification process for the deviation in the corresponding relationship between the count value Nc and the posture position of the steering column 31, as will be described below.

2. Configuration of Steering Column Adjusting Device

Figure 6:
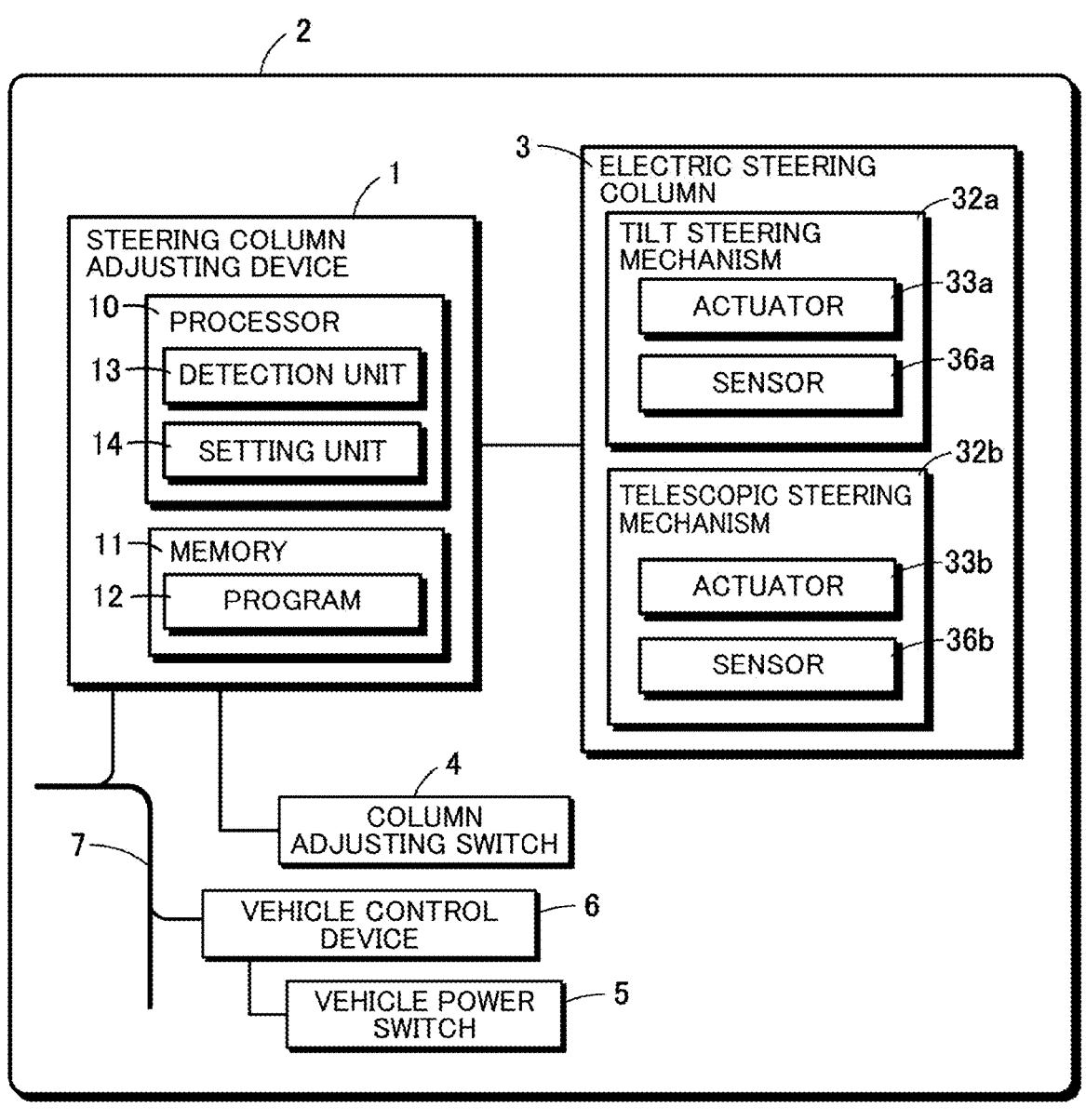
FIG. 6 is a diagram illustrating a configuration of the steering column adjusting device.

FIG. 6 is a diagram illustrating a configuration of the steering column adjusting device 1.

The steering column adjusting device 1 includes a processor 10 and a memory 11. The memory 11 is configured by a volatile and/or nonvolatile semiconductor memory, and/or a hard disk device, for example.

The processor 10 is, for example, a computer including a central processing unit (CPU) and the like. The processor 10 may be configured to include a ROM (Read Only Memory) in which a program is written, a RAM (Random Access Memory) for temporarily storing data, and the like. The processor 10 includes a detection unit 13 and a setting unit 14 as functional components or functional units.

These functional components in the processor 10 are implemented when the processor 10, for example, a computer executes a program 12 stored in the memory 11. The program 12 may be stored in any computer-readable storage medium. Alternatively, all or some of the functional components in the processor 10 can be configured by hardware including one or more electronic circuit components.

The detection unit 13 detects the current posture position of the steering column 31.

Specifically, the detection unit 13 detects the current posture position of the steering column 31, from the operating value that indicates the operation amount of the actuator 33 based on the movable limit position LL of the posture adjusting mechanism 32. As described above, the operating value is a count value obtained by adding and subtracting the number of times of generating a predetermined signal for each unit operation amount of the actuator 33 according to the operation direction of the actuator 33.

More specifically, the detection unit 13 detects the current posture position in the elevation angle direction EL of the steering column 31, from the operating value that indicates the operation amount of the actuator 33$a$ based on the movable limit position $A_{LL}$ of the tilt steering mechanism 32$a$. Here, the operating value is a count value Nc1 obtained by adding and subtracting the number of times of generating a predetermined signal for each unit operation amount of the actuator 33$a$ according to the operation direction of the actuator 33$a$.

In the present embodiment, the actuator 33$a$ is a stepping motor including a magnet rotor 331 having a plurality of poles, and one sensor 36$a$ which is a Hall sensor. The predetermined signal is the pulse signal Sp included in the square wave signal $S_{HALL}$ output from the sensor 36$a$, which is generated every time the magnet rotor 331 of the actuator 33$a$ rotates at a unit angle. The detection unit 13 calculates the count value Nc1 by adding or subtracting the number of times of generating the pulse signal Sp depending on whether the rotation direction of the magnet rotor 331 of the actuator 33$a$ is the forward rotation direction or the reverses rotation direction.

Similarly, the detection unit 13 detects the front-back position $P_{FB}$, which is the posture position in the current front-back direction FB of the steering column 31, from the operating value indicating the operation amount of the actuator 33$b$ based on the movable limit position $P_{LL}$ of the telescopic steering mechanism 32$b$. Here, the operating value is a count value Nc2 obtained by adding and subtracting the number of times of generating a predetermined signal for each unit operation amount of the actuator 33$b$ according to the operation direction of the actuator 33$b$.

In the present embodiment, the actuator 33$b$ is a stepping motor including a magnet rotor 331 having a plurality of poles, and one sensor 36$b$ which is a Hall sensor. The predetermined signal is the pulse signal Sp included in the square wave signal $S_{HALL}$ output from the sensor 36$b$, which is generated every time the magnet rotor 331 of the actuator 33$b$ rotates at a unit angle. The detection unit 13 calculates the count value Nc2 by adding or subtracting the number of times of generating the pulse signal Sp depending on whether the rotation direction of the magnet rotor 331 of the actuator 33$b$ is the forward rotation direction or the reverses rotation direction.

The detection unit 13 performs a modification process to modify the deviation in the relationship between the count value Nc, which is an operating value, and the posture position of the steering column 31.

Specifically, the detection unit 13 detects that an operating load of the actuator 33 becomes an overload equal to or greater than a predetermined threshold during an operation of the actuator 33 performed by the setting unit 14 to be described below. Depending on the detection of the overload, the detection unit 13 stores an operating value (that is, a count value) of the actuator 33 indicating an overload position, which is the posture position of the steering column 31 when the overload is detected. In other words, the detection unit 13 stores the operating value of the actuator 33 when the overload of the actuator 33 is detected.

Then, when an operating value indicating the current overload position detected when the setting unit 14 operates the actuator 33 in one moving direction matches, within a predetermined error range, with an operating value indicating a previous overload position stored in a previous overload operation of the actuator 33 in the one moving direction, the detection unit 13 modifies the operating value by regarding the current overload position as a movable limit position (LU or LL) in the one moving direction. Here, "the movable limit position in one moving direction" means the movable limit position LU when the "one moving direction" is a direction toward the movable limit position LU, and means the movable limit position LL when the "one moving direction" is a direction toward the movable limit position LL.

The operation of the modification process will be described using a concrete example.

Figure 7:
FIG. 7 is an explanatory diagram illustrating a modification operation executed by a detection unit.

FIG. 7 is an explanatory diagram illustrating the modification process. In FIG. 7, three vertical axes on the left side of the drawing are the same as the three vertical axes on the left side in FIG. 5, and are, from the left, a tilt axis indicating the tilt angle $\theta$ of the steering column 31, a first count axis indicating a "correct count value Nc1" having a correct corresponding relationship with the tilt angle, and a second count axis indicating a "deviation count value Nc1" in which there is a deviation in the corresponding relationship with the tilt angle $\theta$, which is the posture position of the steering column 31. As in the example of FIG. 5, in the example of FIG. 7, the "deviation count value Nc1" indicated by the second count axis deviates, by 50 counts in the forward direction (the direction from the movable limit position $A_{LL}$ toward the movable limit position $A_{LU}$), from the "correct count value Nc1" indicated by the first count axis.

A vertical axis on the right side in FIG. 7 is a third count axis indicating a "modified count value Nc1" after the detection unit 13 performs the modification process at time t37.

In the example of FIG. 7, it is assumed that, in an initial state, the detection unit 13 has not yet stored any value of the count value Nc1 indicating an overload position of the actuator 33$a$ in a previous operation.

In FIG. 7, first, at time t31, the column adjusting switch 4 is actuated to give an instruction to the steering column adjusting device 1 to move the steering column 31 in the forward direction (the direction toward the movable limit position $A_{LU}$). The setting unit 14 (to be described below) of the steering column adjusting device 1 instructs the actuator 33$a$ of the tilt steering mechanism 32$a$ to move the steering column 31 in the forward direction. During that time, the detection unit 13 continues to calculate the count value Nc1 by adding the number of times of generating the pulse signal Sp from the sensor 36$a$ of the actuator 33$a$.

As in the example illustrated in FIG. 5, the setting unit 14 attempts to move the steering column 31 up to the position of [count value Nc1=380] corresponding to the set limit position $A_{SU}$ of the set allowable range $SR_{TILT}$, but the steering column 31 hits the movable limit position $A_{LU}$ when the position of [count value Nc1=350] is reached at time t32. At this time, the actuator 33$a$ is in an overload state of not moving the steering column 31 even in an energization state. As described above, at this point of time, the detection unit 13 does not store any value of the count value Nc1 indicating the overload position of the actuator 33$a$ in the previous operation, whereby, depending on the detection of the overload state at time t32, the detection unit 13 stores the value of the count value Nc1 at time t32, which is "350", as a value of the count value Nc1 indicating the overload position.

Here, an operating load of the actuator 33$a$ can be evaluated, for example, by a reciprocal value of the number of pulse signals Sp generated per unit time from the sensor 36$a$ when the actuator 33$a$ is energized. This is because, when the energization voltage is constant, the greater the operating load, the fewer the number of pulse signals Sp generated per unit time, and therefore the greater the load, the greater the reciprocal of the number of generated signals becomes.

As an example, when the number of times of generating the pulse signal Sp per unit time is 5 during a normal operation of the actuator $33a$, the operating load during the normal operation is 0.2 (=⅕). In this case, for example, if a predetermined threshold for the operating load is set to 0.5 (=½), it can be determined that the actuator $33a$ is in an overload state when the number of times of generating the pulse signal Sp per unit time drops to 2 or less.

Thereafter, at time t33, the column adjusting switch 4 is actuated to give an instruction to the steering column adjusting device 1 to move the steering column 31 in the reverse direction (the direction toward the movable limit position $A_{LL}$). The setting unit 14 instructs the actuator $33a$ of the tilt steering mechanism $32a$ to move the steering column 31 in the reverse direction. During that time, the detection unit 13 continues to calculate the count value Nc1 by subtracting the number of times of generating the pulse signal Sp from the sensor $36a$ of the actuator $33a$.

The setting unit 14 instructs the actuator $33a$ to stop operating at time t34 when the steering column 31 reaches the position of [count value Nc1=20] corresponding to the set limit position $A_{SL}$ of the set allowable range $SR_{TILT}$.

Then, at time t35, when the column adjusting switch 4 is actuated again to give an instruction to the steering column adjusting device 1 to move the steering column 31 in the forward direction (the direction toward the movable limit position $A_{LU}$), the setting unit 14 instructs the actuator $33a$ of the tilt steering mechanism $32a$ to move the steering column 31 in the forward direction. During that time, the detection unit 13 continues to calculate the count value Nc1 by adding the number of times of generating the pulse signal Sp from the sensor $36a$ of the actuator $33a$.

The setting unit 14 again attempts to move the steering column 31 up to the position of [count value Nc1=380] corresponding to the set limit position $A_{SU}$ of the set allowable range $SR_{TILT}$, but the steering column 31 hits the movable limit position $A_{LU}$ and stops when the position of [count value Nc1=350] is reached at time t36. At this time, the detection unit 13 detects that the actuator $33a$ is in an overload state.

The detection unit 13 detects at time t36 that the actuator $33a$ is in the overload state and sets the value "350" of the count value Nc1 at time t36 to a value of the count value Nc1 indicating the overload position of the actuator $33a$ in the current operation in the forward direction.

Then, the detection unit 13 compares the value "350" of the count value Nc1 stored in time t32 and indicating the overload position of the actuator $33a$ in the previous operation in the forward direction, with the value "350" of the count value Nc1 detected at time t36 and indicating the overload position of the actuator $33a$ in the current operation in the forward direction.

Since the stored value "350" of the count value Nc1 indicating the previous overload position matches with the stored value "350" of the count value Nc1 indicating the current overload position, the detection unit 13 modifies the value of the count value Nc1. Specifically, at time t37 shortly after time t36, the detection unit 13 determines that the current overload position, that is, the position at which the steering column 31 stops at time t36 is actually the movable limit position $A_{LU}$ in the forward direction of the actuator $33a$, and modifies the value "350" of the current count value Nc1, which stops at time t36, to the correct value "400" corresponding to the movable limit position $A_{LU}$. Here, the correct value "400" corresponding to the movable limit position $A_{LU}$ can be stored in advance as an Nc1 limit value $V_{1U}$ (to be described below).

Thus, the count value Nc1 held by the detection unit 13 conforms to the "corrected count value Nc1" indicated by the third count axis on the right side in FIG. 7, and the count value Nc1 indicates a correct corresponding relationship with the tilt angle θ of the steering column 31 indicated by the tilt axis. For example, the value "400" of the count value Nc1 correctly corresponds to the position of the movable limit position $A_{LU}$ indicated by the tilt axis, and the value "0" of the count value Nc1 correctly corresponds to the position of the movable limit position $A_{LL}$ indicated by the tilt axis.

In addition, the detection unit 13 may be configured to modify the count value Nc1 when the count value Nc1 indicating the previous overload position being stored and the count value Nc1 indicating the current overload position detected at current time match within a predetermined error range. Thus, even when an error occurs between the value of the count value Nc1 indicating the previous overload position and the value of the count value Nc1 indicating the current overload position at the same movable limit position $A_{LU}$, it is possible to correctly determine whether the two values at the same movable limit position $A_{LU}$ match.

The modification process of the count value Nc1, which is described using an example illustrated in FIG. 7, is similarly performed even when the overload state is detected when the actuator $33a$ of the tilt steering mechanism $32a$ moves in the reverse direction (the direction in which the steering column 31 moves toward the movable limit position $A_{LL}$).

In other words, when the value of the count value Nc1 indicating the current overload position detected when the actuator $33a$ is operated in the reverse direction matches, within a predetermined error range, with the value of the count value Nc1 indicating the previous overload position stored in the previous operation of the actuator $33a$ in the reverse direction, the detection unit 13 determines that the current overload position is the movable limit position $A_{LL}$ in the reverse direction, and modifies the count value Nc1 (specifically, resets the count value Nc1 to 0).

Similarly to the modification process of the count value Nc1, which is described using an example illustrated in FIG. 7, the detection unit 13 performs a modification process of the count value Nc2 when the overload state is detected when the actuator $33b$ of the telescopic steering mechanism $32b$ moves in the forward direction (the direction in which the steering column 31 moves toward the movable limit position $P_{LU}$) or the reverse direction (the direction in which the steering column 31 moves toward the movable limit position $P_{LL}$).

In other words, when the value of the count value Nc2 indicating the current overload position detected when the actuator $33b$ of the telescopic steering mechanism $32b$ is operated in the forward direction matches, within a predetermined error range, with the value of the count value Nc2 indicating the previous overload position stored in the previous operation of the actuator $33b$ in the forward direction, the detection unit 13 determines that the current overload position is the movable limit position $P_{LU}$ in the forward direction, and modifies the count value Nc2. Specifically, the current count value Nc2 is modified to the value of the correct count value Nc2 (Nc2 limit value $V_{2U}$ to be described below) corresponding to the movable limit position $P_{LU}$.

In addition, when the value of the count value Nc2 indicating the current overload position detected when the actuator 33b is operated in the reverse direction matches, within a predetermined error range, with the value of the count value Nc2 indicating the previous overload position stored in the previous operation of the actuator 33b in the reverse direction, the detection unit 13 determines that the current overload position is the movable limit position $P_{LL}$ in the reverse direction, and modifies the count value Nc2 (specifically, resets the count value Nc2 to 0).

when the value of the count value Nc indicating the current overload position detected when the actuator 33 is operated in one moving direction does not match, within a predetermined error range, with the value of the count value Nc indicating the previous overload position stored in the previous operation of the actuator 33 in the one direction, the detection unit 13 updates the previous overload position being stored with the current overload position, or maintains the previous overload position being stored.

Specifically, when the current overload position detected when the actuator 33 is operated in the one moving direction is a posture position farther from the movable limit position (LL or LU) in the one moving direction, compared to the previous overload position detected and stored when the actuator 33 is operated in the one moving direction, the detection unit 13 does not store the value of the count value Nc indicating the current overload position and maintains the stored previous overload position. In addition, when the current overload position detected when the actuator 33 is operated in the one moving direction is a posture position closer to the movable limit position (LL or LU) in the one moving direction, compared to the previous overload position detected and stored when the actuator 33 is operated in the one moving direction, the detection unit 13 updates the stored value of the count value Nc indicating the previous overload position with the value of the count value Nc indicating the current overload position.

Here, whether the current overload position detected when the actuator 33 is operated in the one moving direction is a posture position farther from or closer to the movable limit position (LL or LU) in the one moving direction, compared to the previous overload position detected and stored when the actuator 33 is operated in the one moving direction can be determine by whether the value of the count value Nc indicating the current overload position is greater or smaller than the value of the count value Nc indicating the previous overload position.

Thus, for example, when the steering column 31 hits an obstacle before reaching the movable limit position LL or LU and the actuator 33 is overloaded, the overload position may not be stored, and thus the operating value (that is, the count value Nc) can be more accurately modified at the movable limit position LL or LU.

Referring to FIG. 6, depending on the input from the column adjusting switch 4, the setting unit 14 of the steering column adjusting device 1 moves and sets the posture position of the steering column 31 with the actuator 33 within the set allowable range SR predefined within the movable range LR of the posture adjusting mechanism 32, based on the current posture position of the steering column 31 detected by the detection unit 13.

The set allowable range is defined as a range between two set limit positions SL and SU, which are distant, by a predetermined margin range, respectively, from two movable limit positions LL and LU that define the movable range LR. As an example, regarding the posture position in the elevation angle direction EL of the steering column 31 changed by the tilt steering mechanism 32a, as indicated by the tilt axis in FIG. 4, the set allowable range $SR_{TILT}$ is defined as a range between two set limit positions $A_{SL}$ and $A_{SU}$, which are distant, by a predetermined margin range, respectively, from two movable limit positions $A_{LL}$ and $A_{LU}$ that define the movable range $LR_{TILT}$.

The setting unit 14 also stores an in-use posture position and an in-standby posture position of the steering column 31 for each driver of the vehicle 2. The in-use posture position is a posture position of the steering column 31 when the driver is driving, and the in-standby posture position is a posture position of the steering column 31 when the driver is not driving. The in-use posture position and the in-standby posture position are determined within the set allowable range SR. For example, for one driver, the in-use posture position may be a center position of the set allowable range SR, and the in-standby posture position may be the set limit position SU of the set allowable range SR.

When the state of the vehicle 2 satisfies a predetermined first condition, the setting unit 14 moves the steering column 31 to the in-use posture position stored for the driver. In addition, when the state of the vehicle 2 satisfies a predetermined second condition, the setting unit 14 moves the steering column 31 to the in-standby posture position stored for the driver.

Thus, the position of the steering column 31 is automatically adjusted for each driver to the in-use posture position and the in-standby posture position according to the preference of the driver, whereby convenience for the driver can be improved.

In the above, the first condition may indicate that the driver enters the vehicle 2 or starts up the vehicle 2, and the second condition may indicate that the driver leaves the vehicle 2 or stops the vehicle 2. Here, the fact that the driver enters the vehicle 2 and the fact that the driver leaves the vehicle 2 may be determined based on an image from an interior camera (not illustrated) provided in an interior of the vehicle 2. In addition, the start-up of the vehicle 2 and the stop of the vehicle 2 can be determined from information on the actuation of the vehicle power switch 5 via the vehicle control device 6, that is, from the fact that the vehicle power switch 5 is turned from an off state to an on state and the fact that the vehicle power switch 5 is turned from an on state to an off state, respectively.

Thus, depending on the fact that the driver enters the vehicle or the start-up operation of the vehicle from the driver and the fact that the driver leaves the vehicle or the stop operation of the vehicle from the driver, the steering column is adjusted to the in-use posture position and the in-standby posture position according to preferences of the driver, whereby convenience for the driver can be further improved.

3. Operation of Steering Column Adjusting Device

Next, a procedure of the operation of the steering column adjusting device 1 will be described.

The steering column adjusting device 1 executes an initialization process and a setting process. The initialization process is a process for initializing the corresponding relationship between the posture position of the steering column 31 and the count value Nc, which is an operating value indicating the operation amount of the actuator 33. The setting process is a process in which the steering column adjusting device 1 sets the posture position of the steering column 31 depending on the actuation of the column adjusting switch 4 from the driver or the satisfied first condition or second condition described above. The setting process includes the above-described modification process performed by the detection unit 13.

First, the initialization process will be described.

Figure 8:
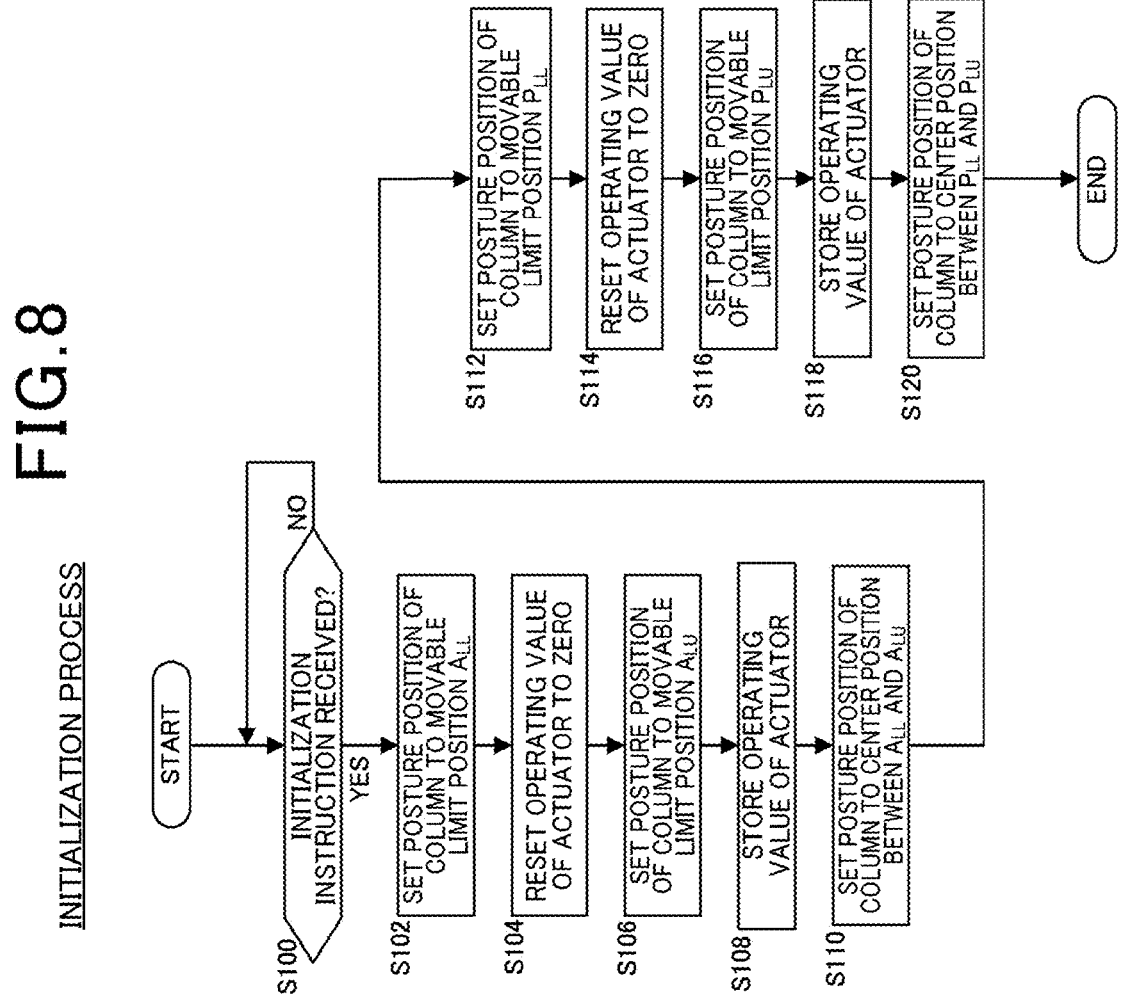
FIG. 8 is a flowchart illustrating a procedure of an initialization process executed by the steering column adjusting device.

FIG. 8 is a flowchart illustrating a procedure of the initialization process performed by the processor 10 which is a computer of the steering column adjusting device 1. The initialization process is executed in a state where no obstacles hindering the movement of the steering column 31 exist around the steering column 31 during maintenance work on the vehicle 2, for example. The process illustrated in FIG. 8 starts when the power supply of the steering column adjusting device 1 is turned on. In FIG. 8, while the posture position of the steering column 31 is being moved by the actuator 33, the detection unit 13 counts the number of times of generating the pulse signal Sp output from the sensor 36 to calculate the count value Nc.

When the process starts, the detection unit 13 of the steering column adjusting device 1 determines whether an initialization instruction has been received (S100). The initialization instruction is transmitted to the steering column adjusting device 1 from the outside of the vehicle 2 via the in-vehicle network bus 7 of the vehicle 2 during maintenance work on the vehicle 2, for example.

When the initialization instruction is not received (S100, NO), the process returns to step S100, the detection unit 13 repeats the process and stands by until the initialization instruction is received. On the other hand, when the initialization instruction is received (S100, YES), the detection unit 13 instructs the setting unit 14 to operate the actuator 33$a$ of the tilt steering mechanism 32$a$ in the reverse direction and to stop the posture position of the steering column 31 at the movable limit position $A_{LL}$ (S102). The fact that the posture position of the steering column 31 is set to the movable limit position $A_{LL}$ can be detected, for example, by the fact that the operating load of the actuator 33$a$ moving in the reverse direction becomes an overload equal to or greater than a predetermined threshold.

Subsequently, the detection unit 13 resets the current value of the count value Nc1, which is an operating value indicating the operation amount of the actuator 33$a$, to zero (0) in a state where the posture position of the steering column 31 is stopped at the movable limit position $A_{LL}$ (S104).

Next, the detection unit 13 instructs the setting unit 14 to operate the actuator 33$a$ in the forward direction and stop the posture position of the steering column 31 at the movable limit position $A_{LU}$ (S106). The fact that the posture position of the steering column 31 is set to the movable limit position $A_{LU}$ can be detected by the fact that the operating load of the actuator 33$a$ moving in the forward direction becomes an overload equal to or greater than a predetermined threshold.

Next, the detection unit 13 stores the current value of the count value Nc1, which is an operating value indicating the operation amount of the actuator 33$a$, as the Nc1 limit value $V_{1U}$, in a state where the posture position of the steering column 31 is stopped at the movable limit position $A_{LU}$ (S108). The detection unit 13 instructs the setting unit 14 to operate the actuator 33$a$ in the reverse direction, to stop the operation of the actuator 33$a$ when the count value Nc1 becomes half the stored Nc1 limit value $V_{1U}$, and to set the posture position of the steering column 31 to the center position between the movable limit position $A_{LU}$ and the movable limit position $A_{LL}$ (S110).

Subsequently, the detection unit 13 instructs the setting unit 14 to operate the actuator 33$b$ of the telescopic steering mechanism 32$b$ in the reverse direction and stop the posture position of the steering column 31 at the movable limit position $P_{LL}$ (S112). The fact that the posture position of the steering column 31 is set to the movable limit position $P_{LL}$ can be detected by the fact that the operating load of the actuator 33$b$ moving in the reverse direction becomes an overload.

Subsequently, the detection unit 13 resets the current value of the count value Nc2, which is an operating value indicating the operation amount of the actuator 33$b$, to zero (0) in a state where the posture position of the steering column 31 is stopped at the movable limit position $P_{LL}$ (S114).

Next, the detection unit 13 instructs the setting unit 14 to operate the actuator 33$b$ in the forward direction and stop the posture position of the steering column 31 at the movable limit position $P_{LU}$ (S116). The fact that the posture position of the steering column 31 is set to the movable limit position $P_{LU}$ can be detected by the fact that the operating load of the actuator 33$b$ moving in the forward direction becomes an overload equal to or greater than a predetermined threshold.

Next, the detection unit 13 stores the current value of the count value Nc2, which is an operating value indicating the operation amount of the actuator 33$b$, as the Nc2 limit value $V_{2U}$ in a state where the posture position of the steering column 31 is stopped at the movable limit position $P_{LU}$ (S118). The detection unit 13 instructs the setting unit 14 to operate the actuator 33$b$ in the reverse direction, to stop the operation of the actuator 33$b$ when the count value Nc2 becomes half the stored Nc2 limit value $V_{2U}$, and to set the posture position of the steering column 31 to the center position between the movable limit position $P_{LU}$ and the movable limit position $P_{LL}$ (S120), and the process ends.

Hereinafter, unless otherwise distinguished, the Nc1 limit value $V_{1U}$ and the Nc2 limit value $V_{2U}$ will be collectively referred to as a Nc limit value VU.

Next, the setting process will be described.

FIG. 9 is a flowchart illustrating a procedure of the setting process performed by the processor 10 which is a computer of the steering column adjusting device 1. As described above, the setting process is a process in which the steering column adjusting device 1 sets the posture position of the steering column 31 depending on the actuation of the column adjusting switch 4 from the driver or the satisfied first condition or second condition described above.

Since the setting process is common to the tilt steering mechanism 32$a$ and the telescopic steering mechanism 32$b$, the operation of the posture adjusting mechanism 32, which is a general term of the tilt steering mechanism 32$a$ and the telescopic steering mechanism 32$b$, will be described with reference to FIG. 9.

In FIG. 9, while the posture position of the steering column 31 is being moved by the actuator 33, the detection unit 13 counts the number of times of generating the pulse signal Sp output from the sensor 36 to calculate the count value Nc, and detects the current posture position of the steering column 31 from the calculated count value Nc. As described above, the count value Nc is an operating value indicating the operation amount of the actuator 33 based on one movable limit position LL of the posture adjusting mechanism 32.

In addition, while the actuator 33 of the posture adjusting mechanism 32 is being operated to move the steering column 31, the setting unit 14 recognizes the posture position of the steering column 31 based on the count value Nc calculated by the detection unit 13.

The process illustrated in FIG. 9 starts when the power supply of the steering column adjusting device 1 is turned on, and is repeatedly executed. The process to be repeatedly executed ends when the power supply of the steering column adjusting device 1 is turned off.

When the process starts, the setting unit 14 of the steering column adjusting device 1 determines whether the column adjusting switch 4 is turned on (S200). Here, the turning-on of the column adjusting switch 4 means, for example, pressing any one of arrows pointing upward and downward or arrows pointing forward and backward of the column adjusting switch 4, which is a rocker switch, as illustrated in FIG. 1. When any one of the arrows of the column adjusting switch 4 is pressed, an instruction is given to the steering column adjusting device 1 to move the posture position in the elevation angle direction EL or to move the posture position in the front-back direction FB.

When the column adjusting switch 4 is turned on (S200, YES), the setting unit 14 moves the steering column 31 within the set allowable range SR in a direction corresponding to the actuation of the column adjusting switch 4 (S220). The moving of the steering column 31 is achieved when the setting unit 14 operates the actuator 33 of the posture adjusting mechanism 32 (that is, the tilt steering mechanism 32a or the telescopic steering mechanism 32b) corresponding to the actuation of the column adjusting switch 4 in a direction corresponding to the actuation of the column adjusting switch 4.

The detection unit 13 determines whether the actuator 33 being in overloaded is detected while the steering column 31 is moving (S222). When it is detected that the load on the actuator 33 becomes an overload (S222, YES), the detection unit 13 executes a modification process (S212), and this process ends. The modification process is a process for modifying the deviation of the operating value indicating the operation amount of the actuator 33 from the movable limit position LL. Details of the modification process will be described below with reference to FIG. 10.

On the other hand, when it is determined in step S222 of FIG. 9 that the actuator 33 being in overloaded is not detected (S222, NO), the setting unit 14 determines whether the column adjusting switch 4 is turned off (S224). Here, the turning-off of the column adjusting switch 4 means that all the arrows pointing upward and downward or forward and backward of the column adjusting switch 4, which is a rocker switch, as illustrated in FIG. 1, are not pressed and no instruction is input to the steering column adjusting device 1 to move the steering column 31.

When the column adjusting switch 4 is turned off (S224, YES), the setting unit 14 ends this process. On the other hand, when the column adjusting switch 4 is not turned off (S224, NO), the process returns to step S220 and the setting unit 14 repeats the process.

On the other hand, when it is determined in step S200 that the column adjusting switch 4 is not turned on (S200, NO), the setting unit 14 determines whether the first condition is satisfied (S202). As described above, the first condition indicates that the driver enters the vehicle 2 or starts up the vehicle 2. Then, when the first condition is satisfied (S202, YES), the setting unit 14 operates the actuator 33 of the posture adjusting mechanism 32 to move the steering column 31 toward the in-use posture position within the set allowable range SR (S214).

The detection unit 13 determines whether the actuator 33 being in overloaded is detected while the steering column 31 is moving toward the in-use posture position (S216). When the actuator 33 being in overloaded is detected (S216, YES), the detection unit 13 executes a modification process (S212), and this process ends.

On the other hand, when the actuator 33 being in overloaded is not detected (S216, NO), the setting unit 14 determines based on the value of the count value Nc whether the steering column 31 reaches the in-use posture position (S218). Then, when the steering column 31 does not reach the in-use posture position (S218, NO), the process returns to step S214, and the setting unit 14 repeats the process. On the other hand, when the steering column 31 reaches the in-use posture position (S218, YES), the setting unit 14 ends this process.

On the other hand, when it is determined in step S202 that the first condition is not satisfied (S202, NO), the setting unit 14 determines whether the second condition is satisfied (S204). As described above, the second condition indicates that the driver leaves the vehicle 2 or stops the vehicle 2. When the second condition is not satisfied (S204, NO), the process returns to step S200, and the setting unit 14 repeats the process.

On the other hand, when the second condition is satisfied (S204, YES), the setting unit 14 operates the actuator 33 of the posture adjusting mechanism 32 to move the steering column 31 toward the in-standby posture position within the set allowable range SR (S206).

The detection unit 13 determines whether the actuator 33 being in overloaded is detected while the steering column 31 is moving toward the in-standby posture position (S208). Then, when the actuator 33 being in overloaded is detected (S208, YES), the detection unit 13 executes a modification process (S212), and this process ends.

On the other hand, when the actuator 33 being in overloaded is not detected (S208, NO), the setting unit 14 determines based on the value of the count value Nc whether the steering column 31 reaches the in-standby posture position (S210). Then, when the steering column 31 does not reach the in-standby posture position (S210, NO), the process returns to step S206, and the setting unit 14 repeats the process. On the other hand, when the steering column 31 reaches the in-standby posture position (S210, YES), the setting unit 14 ends this process.

Figure 10:
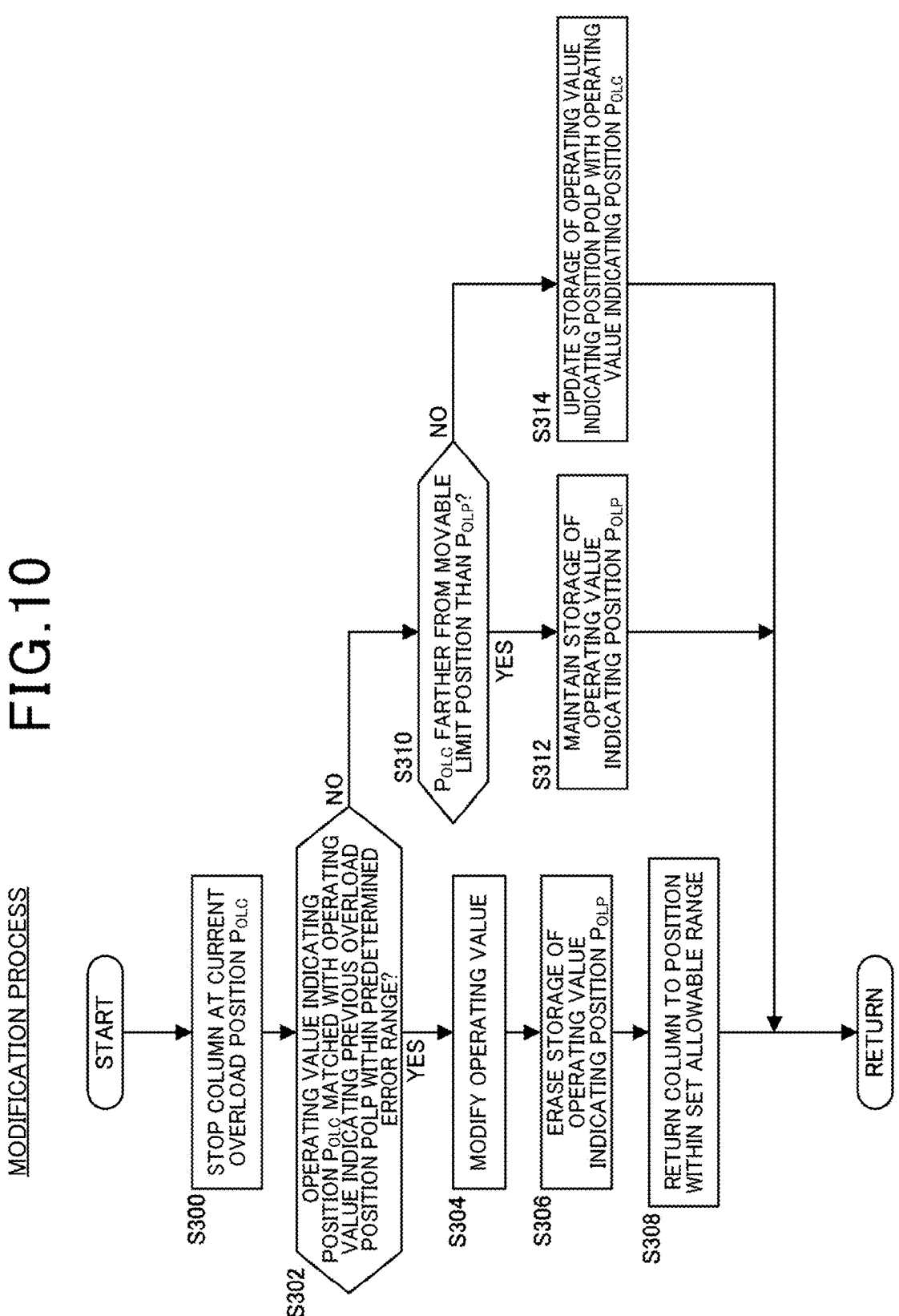
FIG. 10 is a flowchart illustrating a procedure of a modification process in the setting process illustrated in FIG. 9.

FIG. 10 is a flowchart illustrating a procedure of the modification process executed in step S212 of FIG. 9.

When the process starts, first, the detection unit 13 instructs the setting unit 14 to stop the operation of the actuator 33 and stop the moving of the steering column 31 at a current overload position $P_{OLC}$ which is the posture position of the steering column 31 when the overload is detected in immediately preceding step S208, S216, or S222 (S300). Next, the detection unit 13 determines whether the value of the count value Nc, which is an operating value indicating the current overload position $P_{OLC}$ matches, within a predetermined error range, with the value of the count value Nc which is an operating value indicating a previous overload position $P_{OLP}$ stored in step S312 to be described below (S302).

Then, when the value of the count value Nc indicating the current overload position $P_{OLC}$ matches, within a predetermined error range, with the value of the count value Nc indicating the previous overload position $P_{OLP}$ (S302, YES), the detection unit 13 modifies the value of the count value Nc, which is the current operating value of the actuator 33, to 0 (zero) or Nc limit value VU (S304). Specifically, when the operation direction of the actuator 33 immediately before reaching the current overload position $P_{OLC}$ is the reverse direction, the detection unit 13 resets and modifies the count value Nc to 0, and when the operation direction is the forward direction, the detection unit 13 modifies the count value Nc to the Nc limit value $V_U$.

Subsequently, the detection unit 13 erases the value of the count value Nc which is an operating value indicating the previous overload position $P_{OLP}$ being stored (S306). In addition, the detection unit 13 instructs the setting unit 14 to return the posture position of the steering column 31 to the position within the set allowable range SR based on the modified count value Nc (S308), and ends the modification process. After the end of the modification process, the process returns to the setting process illustrated in FIG. 10, and the detection unit 13 ends the setting process.

On the other hand, when it is determined in step S302 that the value of the count value Nc indicating the current overload position $P_{OLC}$ does not match, within a predetermined error range, with the value of the count value Nc indicating the previous overload position $P_{OLP}$ (S302, NO), the detection unit 13 determines whether the current overload position $P_{OLC}$ is farther from the movable limit position (LL or LU) in the operation direction of the actuator 33 immediately before, compared to the previous overload position $P_{OLP}$ indicated by the count value Nc being stored (S310).

Then, when the current overload position $P_{OLC}$ is farther from the movable limit position (LL or LU) in the operation direction of the actuator 33 immediately before, compared to the previous overload position $P_{OLP}$ indicated by the count value Nc being stored (S310, YES), the detection unit 13 does not store the value of the count value Nc which is the operating value indicating the current overload position $P_{OLC}$, maintains the value of the currently stored count value Nc which is the operating value indicating the previous overload position $P_{OLP}$ (S312), and ends this process.

On the other hand, when the current overload position $P_{OLC}$ is closer to the movable limit position (LL or LU) in the operation direction of the actuator 33 immediately before, compared to the previous overload position $P_{OLP}$ indicated by the count value Nc being stored (S310, NO), the detection unit 13 updates the currently stored value of the count value Nc, which is the operating value indicating the previous overload position $P_{OLP}$, with the value of the count value Nc which is the operating value indicating the current overload position $P_{OLC}$, or stores the value of the count value Nc indicating the current overload position $P_{OLC}$ as the operating value indicating the previous overload position $P_{OLP}$ when the value of the count value Nc indicating the previous overload position $P_{OLP}$ is not stored, and ends this process.

Here, the initialization process illustrated in FIG. 8 and the setting process illustrated in FIG. 9 (including the modification process illustrated in FIG. 10) correspond to a steering column adjusting method executed by the processor 10, which is a computer of the steering column adjusting device 1.

For example, as described above with respect to the setting process in FIG. 9, while the posture position of the steering column 31 is being moved by the actuator 33, the detection unit 13 counts the number of times of generating the pulse signal Sp output from the sensor 36, and detects the current posture position of the steering column 31 from the count value Nc, which corresponds to a part of a detection step in a steering column adjusting method. Steps S208, S216, and S224 illustrated in FIG. 9 and the modification process illustrated in FIG. 10 correspond to another part of the detection step in the steering column adjusting method.

Steps S206, S214, and S220 illustrated in FIG. 9 correspond to a setting step in the steering column adjusting method.

The present invention is not limited to the configurations of the above-described embodiments, and can be embodied in various forms without departing from the spirit and scope of the present invention.

6. Configuration Supported by Embodiment

The above-described embodiment is a specific example of the following configuration.

(Configuration 1) A steering column adjusting device that adjusts a posture of a steering column of a vehicle, the steering column adjusting device including: an actuator that drives a posture adjusting mechanism of the steering column to move a posture position of the steering column within a movable range defined by two movable limit positions in the posture adjusting mechanism; and a detection unit that detects a current posture position of the steering column, the detection unit being configured to detect the current posture position of the steering column from an operating value indicating an operation amount of the actuator based on one of the movable limit positions, the detection unit being configured to store the operating value indicating an overload position, which is the posture position at which the actuator is put in an overload equal to or greater than a threshold during an operation of the actuator, the detection unit being configured to modify, when the operating value indicating a current overload position detected when the actuator is operated in one moving direction matches, within a predetermined error range, with the operating value indicating a previous overload position stored in a previous operation of the actuator in the one moving direction, a first operating value such that the current overload position is a previous movable limit position in a first moving direction.

According to the steering column adjusting device of Configuration 1, even when a deviation occurs in a corresponding relationship between the operating value of the actuator and the posture position of the steering column, the actuator detects, as being overloaded twice at the same position, that the steering column reaches the movable limit position, the operating value of the actuator is modified, whereby it is possible to appropriately modify the deviation in the detection of the posture position of the steering column, and to stably and accuracy adjust the posture position of the steering column.

(Configuration 2) In the steering column adjusting device according to Configuration 1, when the current overload position detected when the actuator is operated in the one moving direction is the posture position farther from the movable limit position in the one moving direction, compared to the previous overload position detected and stored when the actuator is operated in the one moving direction, the detection unit does not store the operating value indicating the current overload position, and continuously stores the operating value indicating the previous overload position, and when the current overload position detected when the actuator is operated in the one moving direction is a posture position closer to the movable limit position in the one moving direction, compared to the previous overload position detected and stored when the actuator is operated in the one moving direction, the detection unit updates the stored value of the operating value indicating the previous overload position with the operating value indicating the current overload position.

According to the steering column adjusting device of Configuration 2, when the current overload position is farther from the movable limit position compared to the previous overload position being stored, since the current overload position is not stored as the previous overload position, the overload position is not stored in a case where the steering column hits an obstacle before reaching the movable limit position and the actuator is overloaded, and the operating value can be modified more appropriately.

(Configuration 3) In the steering column adjusting device according to Configuration 1 or 2, the operating value of the actuator is a count value obtained by adding and subtracting a number of times of generating a predetermined signal for each unit operation amount of the actuator according to an operation direction of the actuator.

According to the steering column adjusting device of Configuration 3, the operating value indicating the operation amount of the actuator based on one movable limit position can be easily acquired as a count value of the number of times of generating a predetermined signal for each unit operation amount of the actuator.

(Configuration 4) In the steering column adjusting device according to Configuration 3, the actuator is a motor including a magnet rotor having a plurality of poles, and one sensor which is a Hall sensor, and the predetermined signal is a pulse signal that is generated every time the magnet rotor rotates at a unit angle, the pulse signal being involved in a square wave signal output from the sensor.

According to the steering column adjusting device of Configuration 4, even when the motor including the magnet rotor is used as the actuator, it is possible to easily acquire the count value, which is an operating value.

(Configuration 5) In the steering column adjusting device according to any one of Configurations 1 to 4, the steering column adjusting device further includes a setting unit that sets the posture position of the steering column by the actuator within a set allowable range predefined within the movable range of the steering column in the posture adjusting mechanism, and the set allowable range is defined as a range between two set limit positions, which are distant, by a predetermined margin range, respectively, from the two movable limit positions.

According to the steering column adjusting device of Configuration 5, since the posture of the steering column is adjusted within the set allowable range narrower than the movable limit range, it is possible to prevent the steering column from repeatedly colliding at the movable limit position during the posture adjustment, thereby preventing the occurrence of damage or breakage of the posture adjusting mechanism.

(Configuration 6) In the steering column adjusting device according to Configuration 5, the setting unit stores, for each driver of the vehicle, an in-use posture position of the steering column when the driver is driving and an in-standby posture position of the steering column when the driver is not driving, and the setting unit moves the steering column to the in-use posture position for the driver when a state of the vehicle satisfies a predetermined first condition, and moves the steering column to the in-standby posture position for the driver when the state of the vehicle satisfies a predetermined second condition.

According to the steering column adjusting device of Configuration 6, since the steering column is automatically adjusted for each driver to the in-use posture position and the in-standby posture position according to the preference of the driver, convenience for the driver can be improved.

(Configuration 7) In the steering column adjusting device according to Configuration 6, the first condition indicates that the driver enters the vehicle or starts up the vehicle, and the second condition indicates that the driver leaves the vehicle or stops the vehicle.

According to the steering column adjusting device of Configuration 7, depending on the fact that the driver enters the vehicle or the start-up operation of the vehicle from the driver and the fact that the driver leaves the vehicle or the stop operation of the vehicle from the driver, the steering column is adjusted to the in-use posture position and the in-standby posture position according to preferences of the driver, whereby convenience for the driver can be further improved.

(Configuration 8) A steering column adjusting method executed by a computer of a steering column adjusting device that adjusts a posture of a steering column of a vehicle, the steering column adjusting method including: a setting step of driving a posture adjusting mechanism of the steering column using an actuator to move a posture position of the steering column within a movable range defined by two movable limit positions in the posture adjusting mechanism; and a detection step of detecting a current posture position of the steering column, the detection step including detecting the current posture position of the steering column from an operating value indicating an operation amount of the actuator based on one of the movable limit positions, storing the operating value indicating an overload position, which is the posture position at which the actuator is put in an overload equal to or greater than a threshold during an operation of the actuator, modifying, when the operating value indicating a current overload position detected when the actuator is operated in one moving direction matches, within a predetermined error range, with the operating value indicating a previous overload position stored in a previous operation of the actuator in the one moving direction, a first operating value such that the current overload position is a previous movable limit position in a first moving direction.

According to the steering column adjusting method of Configuration 8, the same effects as those of Configuration 1 can be achieved.

REFERENCE SIGNS LIST 1 steering column adjusting device
2 vehicle
3 electric steering column
4 steering column adjusting switch (column adjusting switch)
5 vehicle power switch
6 vehicle control device
7 vehicle network bus
10 processor
11 memory
12 program
13 detection unit
14 setting unit
31 steering column
32 posture adjusting mechanism
32a tilt steering mechanism
32b telescopic steering mechanism
33, 33a, 33b actuator
35 steering wheel
36, 36a, 36b sensor
330 rotation axis
331 magnet rotor
332 stator
333 drive control circuit
The invention claimed is:
1. A steering column adjusting device that adjusts a posture of a steering column of a vehicle, the steering column adjusting device comprising:

an actuator that drives a posture adjusting mechanism of the steering column to move a posture position of the steering column within a movable range defined by two movable limit positions in the posture adjusting mechanism; and a detection unit that detects a current posture position of the steering column, the detection unit being configured to detect the current posture position of the steering column from an operating value indicating an operation amount of the actuator based on one of the movable limit positions, the detection unit being configured to store the operating value indicating an overload position, which is the posture position at which the actuator is put in an overload equal to or greater than a predetermined threshold during an operation of the actuator, the detection unit being configured to modify, when the operating value indicating a current overload position detected when the actuator is operated in one moving direction matches, within a predetermined error range, with the operating value indicating a previous overload position stored in a previous operation of the actuator in the one moving direction, the operating value such that the current overload position is the movable limit position in the one moving direction.

2. The steering column adjusting device according to claim 1, wherein when the current overload position detected when the actuator is operated in one moving direction is the posture position farther from the movable limit position in the one moving direction, compared to the previous overload position detected and stored when the actuator is operated in the one moving direction, the detection unit does not store the operating value indicating the current overload position, and continuously stores the operating value indicating the previous overload position, and when the current overload position detected when the actuator is operated in the one moving direction is the posture position closer to the movable limit position in the one moving direction, compared to the previous overload position detected and stored when the actuator is operated in the one moving direction, the detection unit updates the stored value of the operating value indicating the previous overload position with the operating value indicating the current overload position.

3. The steering column adjusting device according to claim 1, wherein the operating value of the actuator is a count value obtained by adding and subtracting a number of times of generating a predetermined signal for each unit operation amount of the actuator according to an operation direction of the actuator.

4. The steering column adjusting device according to claim 3, wherein the actuator is a motor including a magnet rotor having a plurality of poles, and one sensor which is a Hall sensor, and the predetermined signal is a pulse signal that is generated every time the magnet rotor rotates at a unit angle, the pulse signal being involved in a square wave signal output from the sensor.

5. The steering column adjusting device according to claim 1, further comprising a setting unit that sets the posture position of the steering column by the actuator within a set allowable range predefined within the movable range of the steering column in the posture adjusting mechanism, wherein the set allowable range is defined as a range between two set limit positions, which are distant, by a predetermined margin range, respectively, from the two movable limit positions.

6. The steering column adjusting device according to claim 5, wherein the setting unit stores, for each driver of the vehicle, an in-use posture position of the steering column when the driver is driving and an in-standby posture position of the steering column when the driver is not driving, and the setting unit moves the steering column to the in-use posture position for the driver when a state of the vehicle satisfies a predetermined first condition, and moves the steering column to the in-standby posture position for the driver when the state of the vehicle satisfies a predetermined second condition.

7. The steering column adjusting device according to claim 6, wherein the first condition indicates that the driver enters the vehicle or starts up the vehicle, and the second condition indicates that the driver leaves the vehicle or stops the vehicle.

8. A steering column adjusting method executed by a computer of a steering column adjusting device that adjusts a posture of a steering column of a vehicle, the steering column adjusting method comprising:

a setting step of driving a posture adjusting mechanism of the steering column using an actuator to move a posture position of the steering column within a movable range defined by two movable limit positions in the posture adjusting mechanism; and a detection step of detecting a current posture position of the steering column, the detection step including detecting the current posture position of the steering column from an operating value indicating an operation amount of the actuator based on one of the movable limit positions, storing the operating value indicating an overload position, which is the posture position at which the actuator is put in an overload equal to or greater than a predetermined threshold during an operation of the actuator, modifying, when the operating value indicating a current overload position detected when the actuator is operated in one moving direction matches, within a predetermined error range, with the operating value indicating a previous overload position stored in a previous operation of the actuator in the one moving direction, the operating value such that the current overload position is the movable limit position in the one moving direction.

* * * * *